(12) United States Patent
Fukushima et al.

(10) Patent No.: US 9,151,586 B2
(45) Date of Patent: Oct. 6, 2015

(54) POSITION INDICATOR

(71) Applicant: Wacom Co., Ltd., Saitama (JP)

(72) Inventors: Yasuyuki Fukushima, Saitama (JP); Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 339 days.

(21) Appl. No.: 13/854,716

(22) Filed: Apr. 1, 2013

(65) Prior Publication Data

US 2013/0269446 A1    Oct. 17, 2013

(30) Foreign Application Priority Data

Apr. 13, 2012 (JP) ................................. 2012-092345

(51) Int. Cl.
*G06F 3/033* (2013.01)
*G01B 5/00* (2006.01)
*G06F 3/0354* (2013.01)
*G06F 3/046* (2006.01)

(52) U.S. Cl.
CPC .......... *G01B 5/0004* (2013.01); *G06F 3/03545* (2013.01); *G06F 3/046* (2013.01); *G06F 2200/1632* (2013.01)

(58) Field of Classification Search
None
See application file for complete search history.

(56) References Cited

U.S. PATENT DOCUMENTS

2003/0122795 A1    7/2003    Fujitsuka et al.

FOREIGN PATENT DOCUMENTS

| EP | 0 727 756 A1 | 8/1996 |
| JP | 2002244806 A | 8/2002 |

OTHER PUBLICATIONS

Extended European Search Report, mailed Nov. 7, 2013, for corresponding European Application No. 13162834.9-1960 / 2650761, 4 pages.

*Primary Examiner* — Kenneth B Lee, Jr.
(74) *Attorney, Agent, or Firm* — Seed IP Law Group PLLC

(57) ABSTRACT

A position indicator is provided, which includes a chassis that accommodates a holder therein, wherein the holder in turn accommodates various elements therein. The holder includes a core body engaging portion configured to hold a core body, a component disposing portion in which one or more pressure-sensitive components are disposed in an axial direction so as to receive a pressing pressure applied to the core body, and a printed wiring board mounting portion for being engaged with and mounting a printed wiring board with a longitudinal direction of the printed wiring board as the axial direction. The core body and the one or more pressure-sensitive components are held by the core body engaging portion and the component disposing portion in such a way that their central positions are aligned with each other in a predetermined position.

20 Claims, 14 Drawing Sheets

POSITION INDICATOR

CROSS-REFERENCE TO RELATED APPLICATION(S)

The present application claims priority under 35 U.S.C. 119(a) of Japanese Application No. 2012-092345, filed Apr. 13, 2012, the entire content of which is incorporated herein by reference.

BACKGROUND OF THE INVENTION

1. Field of the Invention

The present invention relates to a position indicator, having a pen-like shape for example, which is used together with a position detector, and more particularly to a position indicator which has a function of detecting a pressure applied to a tip portion of the position indicator.

2. Description of the Related Art

In recent years, a position input device as an input device has been used in a tablet type personal computer (PC) or the like. The position input device is composed, for example, of a position indicator which is formed so as to have a pen-like shape, and a position detector having an input surface, on which a pointing operation is carried out, characters, figures or the like are inputted, and so forth, by using the position indicator.

FIG. 15 shows an example of a schematic structure of a conventional pen type position indicator 100. The conventional pen type position indicator 100 of this example shown in FIG. 15 is described in Patent Document 1 of Japanese Patent Laid-Open No. 2002-244806, and is used for an electromagnetic induction type position detector. The conventional pen type position indicator 100 of this example includes a resonance circuit, which has a ferrite core 104 and a ferrite chip 102, and which also has one or more resonance capacitors 115 connected to a coil 105 wound around the ferrite core 104.

Although FIG. 15 is a cross sectional view of the position indicator 100, for the sake of clear description, FIG. 15 shows a state in which the coil 105 is wound around the ferrite core 104. As shown in FIG. 15, the conventional pen type position indicator 100 is structured in such a way that the ferrite core 104, around which the coil 105 is wound, and the ferrite chip 102 are made to face each other through an O ring 103, and the ferrite chip 102 comes close to the ferrite core 104 when a pressing pressure (pen pressure) is applied to a core body 101.

It is noted that the O ring 103 is a ring-like elastic member which is obtained by forming an elastic material, such as a synthetic resin or a synthetic rubber, into an O-like shape. In addition, in the position indicator 100, in addition to the constituent elements described above, as shown in FIG. 15, a board holder 113, a board 114, a resonance capacitor 115, a connection line 116 through which the resonance capacitor 115 and the coil 105 are connected to each other, thereby configuring a resonance circuit, a ring type film 117, and a buffer member 118 are accommodated in a hollow chassis (hereinafter simply referred to as "a case") 111, and positions thereof are fixed by a cap 112.

Also, when the ferrite chip 102 with which the core body 101 composing the pen tip is brought in contact comes close to the ferrite core 104 in accordance with the pressing pressure applied to the core body 101, an inductance of the coil 105 is changed in response to this operation, and thus a phase (resonance frequency) of an electric wave which is transmitted from the coil 105 of the resonance circuit is changed.

SUMMARY OF THE INVENTION

In the conventional pen type position indicator 100 having the structure shown in FIG. 15, the components, including the elastic O ring 103, disposed inside the case 111 are directly accommodated in the case 111 in a state in which a biasing force (stress) is directly applied to the case 111.

For this reason, when the conventional pen type position indicator 100 shown in FIG. 15 is dropped by mistake, thereby applying a shock to the case 111, this shock is transferred to the inside of the case 111, thereby causing position shift in the components such as the O ring 103, the ferrite core 104, and the ferrite chip 102. Then, it is feared that the position shift of the components causes a change in a circuit constant, and thus it may be impossible to properly use the conventional pen type position indicator 100. In particular, in the case where the pen type conventional position indicator includes the ferrite core, when the ferrite core is damaged by the shock and a central axis of the ferrite core is shifted, the circuit constant is changed, and the change in the inductance due to the adjacency of the ferrite chip 102 deviates from a desired change in some cases.

In addition, adjustment is generally necessary for the components accommodated in the inside of the case 111 and the internal circuit composed of the components. However, in the case of the conventional pen type position indicator 100 having the structure shown in FIG. 15, the components including the elastic O ring 103 are accommodated in the case 111 in the state in which the stress is directly applied to the case 111. As a result, even if the adjustment is carried out before the components including the elastic O ring 103 are accommodated in the case 111, the circuit constant is changed due to the stress described above. For this reason, even when the adjustment is carried out before accommodation of the components including the elastic O ring 103 in the case 111, it is necessary to carry out the readjustment in the state in which the components including the elastic O ring 103 are accommodated in the case 111.

In addition, in the case of the structure in which the group of components is accommodated in the case 111 in the state in which a biasing force (stress) is directly applied to the case 111, there is also a problem that, with a long time in usage or use in a severe high-temperature state, the case 111 of the conventional pen type position indicator 100 may be bent into a banana-like shape.

In order to address these problems, one approach was adopted to modularize the group of components (e.g., the O ring 103) in a portion, which is elastically biased, and to combine the resulting module with other components, thereby preventing the elastic biasing force described above from being directly applied to the case 111.

On the other hand, in recent years, along with the miniaturization of portable electronic apparatuses such as a PDA, and a high-performance cellular phone unit, a thinner shape has been required for the pen type position indicator. However, when the group of components in the portion(s) which is (are) elastically biased is assembled in advance to make the modularized components, it is difficult to miniaturize the modularized components, which becomes an obstacle when the pen type position indicator is thinned. In addition, when the predetermined group of components is assembled to make the modularized components, it takes time to carry out the assembly for the modularized components. That is, after a worker takes time to assemble the components to modularize the components, he/she needs to combine the resulting module with other components and dispose the module and the other components thus combined within the case 111, which leads to poor productivity.

In accordance with one aspect, the present invention is directed to solving the problems described above, and to providing a position indicator which can be formed in a thinner shape while preventing direct application of a stress to a chassis and avoiding the problems as described above.

According to one aspect of the present invention, there is provided a position indicator including:

a cylindrical chassis;

a core body which is disposed within the cylindrical chassis in such a way that a tip thereof protrudes from a distal opening end of the cylindrical chassis;

a printed wiring board which is disposed within the cylindrical chassis and which is provided with a circuit element to detect a pressing pressure applied to the tip of the core body;

one or more pressure-sensitive components configured to detect a displacement of the core body, in an axial direction of the cylindrical chassis, corresponding to the pressing pressure applied to the tip; and a holder which is accommodated within a hollow portion of the cylindrical chassis with the axial direction of the cylindrical chassis as a longitudinal direction, the holder including:

a core body engaging portion configured to hold the core body, thereby being engaged with the core body so as to regulate a movement of the core body in a direction toward the tip;

a component disposing portion in which the one or more pressure-sensitive components are disposed in the axial direction so as to receive the pressing pressure applied to the core body; and a printed wiring board mounting portion which is engaged with the printed wiring board to mount the printed wiring board in a state in which a longitudinal direction of the printed wiring board is set as the axial direction, wherein the core body and the one or more pressure-sensitive components are held by the core body engaging portion and the component disposing portion in such a way that the central positions of the core body and the one or more pressure-sensitive components are aligned in a determined position, the holder which holds and mounts the core body, the printed wiring board, and the one or more pressure-sensitive components is accommodated in the cylindrical chassis, and the pressing pressure from the core body is detected by the circuit element on the printed wiring board.

In the position indicator having the structure described above according to the present invention, the core body, the one or more pressure-sensitive components, and the printed wired board are disposed and held in the holder, which is accommodated in the inside of the cylindrical chassis. In this case, since the one or more pressure-sensitive components, which are biased by the pressing pressure applied to the core body, are disposed in the component disposing portion and held in the holder, the biasing force is not directly applied to the cylindrical chassis.

Also, in the position indicator according to the present invention, by being disposed in the component disposing portion, the one or more pressure-sensitive components are held such that their central positions are registered with determined positions, respectively, with respect to the holder. Each of the central positions of the one or more pressure-sensitive components agrees with a center line position of the core body in the state in which the one or more pressure-sensitive components are held by the holder.

Therefore, in the position indicator according to the present invention, even when a shock is applied to the cylindrical chassis, the center line position of the core body held by the holder, and the center line portions of the one or more pressure-sensitive components also held by the holder can be prevented from being shifted from each other. In addition, since the structure is obtained in which the biasing force due to the internal components is not directly applied to the cylindrical chassis, when adjustments for the core body, the printed wiring board, and the one or more pressure-sensitive components which are all held by the holder are carried out before the holder is accommodated in the cylindrical chassis, it is not necessary to carry out readjustment after the holder is accommodated in the cylindrical chassis. In addition, even when the position indicator is used for a long period of time or in a severe high-temperature state, the cylindrical chassis is prevented from being deformed into a banana-like shape.

In addition, in the position indicator according to the present invention, as previously stated, the one or more pressure-sensitive components, which are biased by the pressing pressure applied to the core body, are arranged and disposed in the component disposing portion in the axial line direction with respect to the core body and held by the holder. Therefore, the one or more pressure-sensitive components need not be modularized components and can be arranged as the components suited for thinning the position indicator.

In addition, since the holder only has to be accommodated in the cylindrical chassis after the core body, the one or more pressure-sensitive components, and the printed wiring board are disposed in the holder, ease of manufacturing the position indicator is also improved.

As set forth hereinabove, according to various aspects of the present invention, the core body, the one or more pressure-sensitive components, and the printed wired board are disposed and held in the holder, which is accommodated in the inside of the cylindrical chassis. Thus, it is possible to provide a position indicator capable of preventing (internal) stress from being applied directly to the cylindrical chassis, to improve ease of manufacturing the position indicator, and to make the position indicator thinner.

DETAILED DESCRIPTION

Embodiments of a position indicator according to the present invention will be described in detail hereinafter with reference to the accompanying drawings.

First Embodiment

Figure 1:
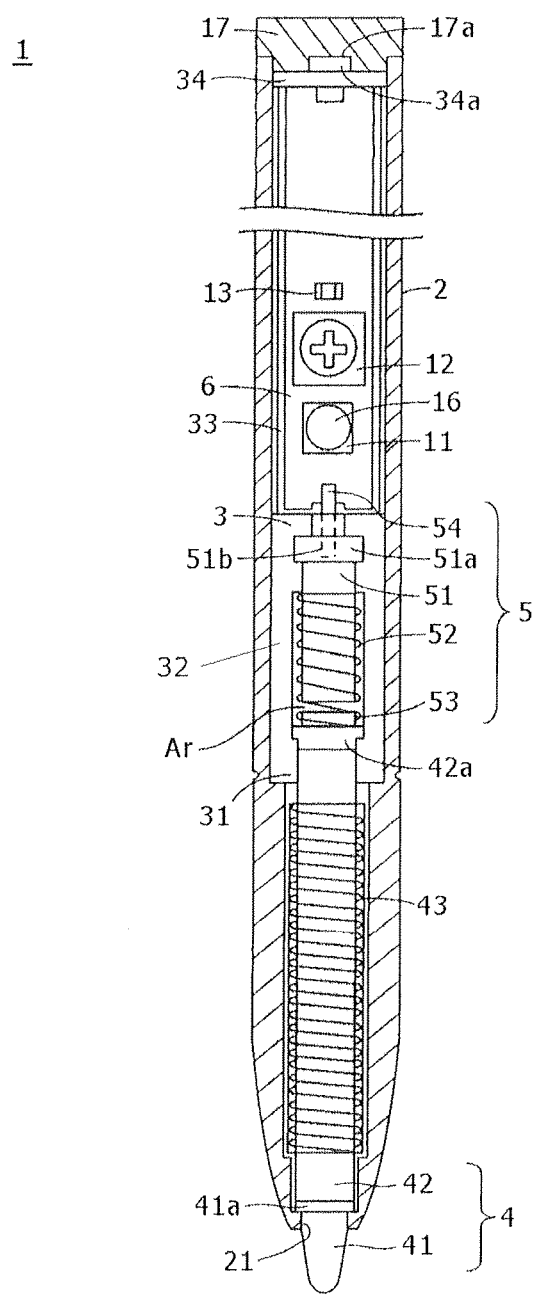
FIG. 1 shows a structure of a position indicator according to a first embodiment of the present invention.
Figure 2:
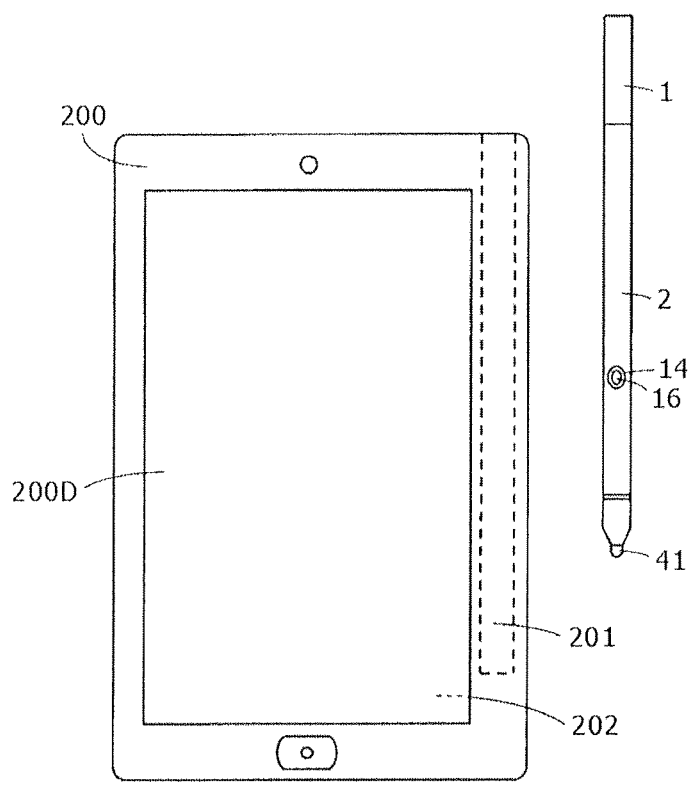
FIG. 2 is a top plan view showing an example of a combination of the position indicator according to the first embodiment of the present invention, and an electronic apparatus including a position detector used together with the position indicator.

FIG. 1 illustrates a structure of a pen-shaped position indicator 1 according to a first embodiment of the present invention. In addition, FIG. 2 is a top plan view showing an example of an electronic apparatus 200 for use with the pen-shaped position indicator 1 according to the first embodiment of the present invention. In the case shown in FIG. 2, the electronic apparatus 200 is, for example, a high-performance cellular phone unit including a display screen 200D of a display device, such as a Liquid Crystal Display (LCD) device. Also, in the illustrated embodiment, the electronic apparatus 200 includes an electromagnetic induction type position detector 202 on a lower portion (back side) of the display screen 200D.

A chassis of the electronic apparatus 200 in this case is provided with an accommodation concave hole 201 for accommodating therein the pen-shaped position indicator 1. A user takes out the pen-shaped position indicator 1 accommodated in the accommodation concave hole 201 from the electronic apparatus 200 as may be necessary, and carries out a position indicating operation on the display screen 200D of the electronic apparatus 200.

In the electronic apparatus 200, when a position indicating operation is carried out on the display screen 200D based on the pen-shaped position indicator 1, the position detector 202 provided on the lower portion of the display screen 200D detects both a position, where the operation is carried out by the pen-shaped position indicator 1, and a pen pressure applied to the display screen 200D. A microcomputer included in the position detector 202 of the electronic apparatus 200 executes display processing corresponding to both of the operation position and the pen pressure on the display screen 200D.

FIG. 1 shows an overall structure of the pen-shaped position indicator 1 of the first embodiment. FIG. 1, for the sake of illustration, shows the inside of the pen-shaped position indicator 1 by cutting out and removing away a case 2 of the pen-shaped position indicator 1.

As shown in FIG. 1, the pen-shaped position indicator 1 includes the case 2, which is long and thin in an axial direction, and which forms a cylindrical chassis having a bottom. The case 2 is made of, for example, a resin or the like, and has a cylindrical shape including a hollow portion inside thereof.

In the pen-shaped position indicator 1 of the first embodiment, as will be described later, a holder 3 which holds therein a core body 4, a pressure-sensitive component (a component configured to detect a pen pressure) 5, and a printed wiring board 6 is accommodated in the hollow portion of the case 2. The holder 3 is made of, for example, a resin. In addition, in the illustrated embodiment, the core body 4 is composed of a protrusion member (pen tip member) 41 and a ferrite core 42. The pressure-sensitive component 5 is composed of a ferrite tip 51, a coil spring 52, and an elastic body, which is a silicon rubber 53 in this example. It is noted that the ferrite core 42 is an example of a first magnetic body, and the ferrite chip 51 is an example of a second magnetic body.

One end side in the axial direction of the case 2 is a pen tip side of the pen-shaped position indicator 1, and the pen tip side of the case 2 is provided with a through hole 21, through which the protrusion member (pen tip member) 41 protrudes to the outside.

On the pen tip side within the case 2 of the pen-shaped position indicator 1, as shown in FIG. 1, the protrusion member 41 is accommodated in the hollow portion of the case 2 in a state in which a part of the protrusion member 41 protrudes to the outside through the through hole 21. The protrusion member 41 includes a guard portion 41a, which engages with the case 2, to be prevented from breaking away from the through hole 21. It is noted that the protrusion member 41 is made of a synthetic resin such as a polyacetal resin (DURACON: registered trademark) to have a sufficient resistance property against friction when the protrusion portion 41 is used in contact with the operation surface.

The ferrite core 42, as an example of a magnetic material, around which a position indicating coil 43 as an example of an inductance element is wound, is disposed on a side opposite to a protrusion side of the protrusion member 41 within the case 2. In the present example, the ferrite core 42 has a columnar shape.

The ferrite core 42 forming a part of the core body 4 includes a guard portion 42a whose diameter is larger than that of a winding portion, on which the position indicating coil 43 is wound, on a side opposite to the side of the protrusion member 41. The guard portion 42a engages with a core body engaging portion 31 of the holder 3, to be engaged with and held by the holder 3.

The holder 3 includes a component disposing portion 32, which is formed adjacent to the core body engaging portion 31, and further includes a printed wiring board mounting portion 33 which is formed adjacent to the component disposing portion 32, on a side opposite to the core body 4. The ferrite chip 51, the coil spring 52, and the silicon rubber 53, which compose the pressure-sensitive component 5, are arranged in the axial direction along a line extending from the printed wiring board 6 side to the core body 4 side, in order, and are held in the component disposing portion 32. A printed wiring board 6 is mounted on the printed wiring board mounting portion 33 of the holder 3.

A detailed structure of the holder 3, and a structure in which the core body 4, the pressure-sensitive component 5, and the printed wiring board 6 are all held and mounted on the holder 3, will be described in detail later.

The printed wiring board 6 has a width smaller than an internal diameter of the case 2, and has an elongated rectangular shape. Although an illustration is omitted here for the sake of simplicity, both ends of the position indicating coil 43 are, for example, soldered to a conductive pattern which is formed on the printed wiring board 6.

The printed wiring board 6 is provided with a push switch 11, which is ON when it is depressed, and turns to an OFF state when it is not depressed. The printed wiring board 6 is provided with capacitors 12 and 13 composing, together with the position indicating coil 43, a resonance circuit. In this case, the capacitor 12 is a trimming capacitor whose capacitance can be adjusted. In addition thereto, a conductive pattern (not shown) is formed on the printed wiring board 6. In this case, the capacitor 12 is connected in parallel with the position indicating coil 43, the capacitor 13 and the push switch 11 are connected in series with each other, and a series circuit of the capacitor 13 and the push switch 11 is connected in parallel with the position indicating coil 43.

In this case, a through hole 14 (refer to FIG. 2) is bored in a position, corresponding to the push switch 11, of a peripheral surface of the case 2 of the pen-shaped position indicator 1. Thus, a pressing operation portion 16 of the push switch 11 is exposed to the outside through the through hole 14 to permit pressing of the push switch 11. In this case, to the pressing operation of the push switch 11 via the pressing operation portion 16, a predetermined function is allocated by the electronic apparatus 200 including the position detector 202. For example, in the electronic apparatus 200 in this case, an operation analogous to a clicking operation with a pointing device such as a mouse is allocated to the pressing operation of the push switch 11 via the pressing operation portion 16.

The capacitors 12 and 13 composing a part of the resonance circuit are disposed as chip components in this case on the printed wiring board 6. In the first embodiment, a resonance frequency of the resonance circuit is adjusted by adjusting the capacitance of the trimming capacitor 12.

It is noted that a cover body 17 is mounted so as to be fitted into the case 2, whereby a side of the case 2 opposite to the pen tip side is closed. A concave portion 17a is formed approximately in a central portion of a surface of the cover body 17 located in the hollow portion of the case 2. On the other hand, a protrusion portion 34a, which is fitted into the concave portion 17a, is provided in an end portion 34 of the holder 3 on the cover body 17 side in the axial direction. The cover body 17 is mounted to the case 2, whereby the concave portion 17a and the protrusion portion 34a are fitted into each other, and based on this fitting, the holder 3 is engaged within the case 2 in a state in which a center line position of the holder 3 agrees with the center line position of the cylindrical case 2.

In this case, as will also be described later, the pressure-sensitive component 5, which is elastically biased in the axial direction of the cylindrical case 2, is held in the component disposing portion 32, and the component disposing portion 32 is provided between the guard portion 42a of the ferrite core 42, which is engaged with the core body engaging portion 31 of the holder 3, and the printed wiring board mounting portion 33 of the holder 3. Thus, the elastic biasing is generated only within the holder 3. Therefore, a stress due to the elastic biasing of the pressure-sensitive component 5 is prevented from being applied to the case 2.

Circuit Configuration for Position Detection in Electronic Apparatus 200

Figure 3:
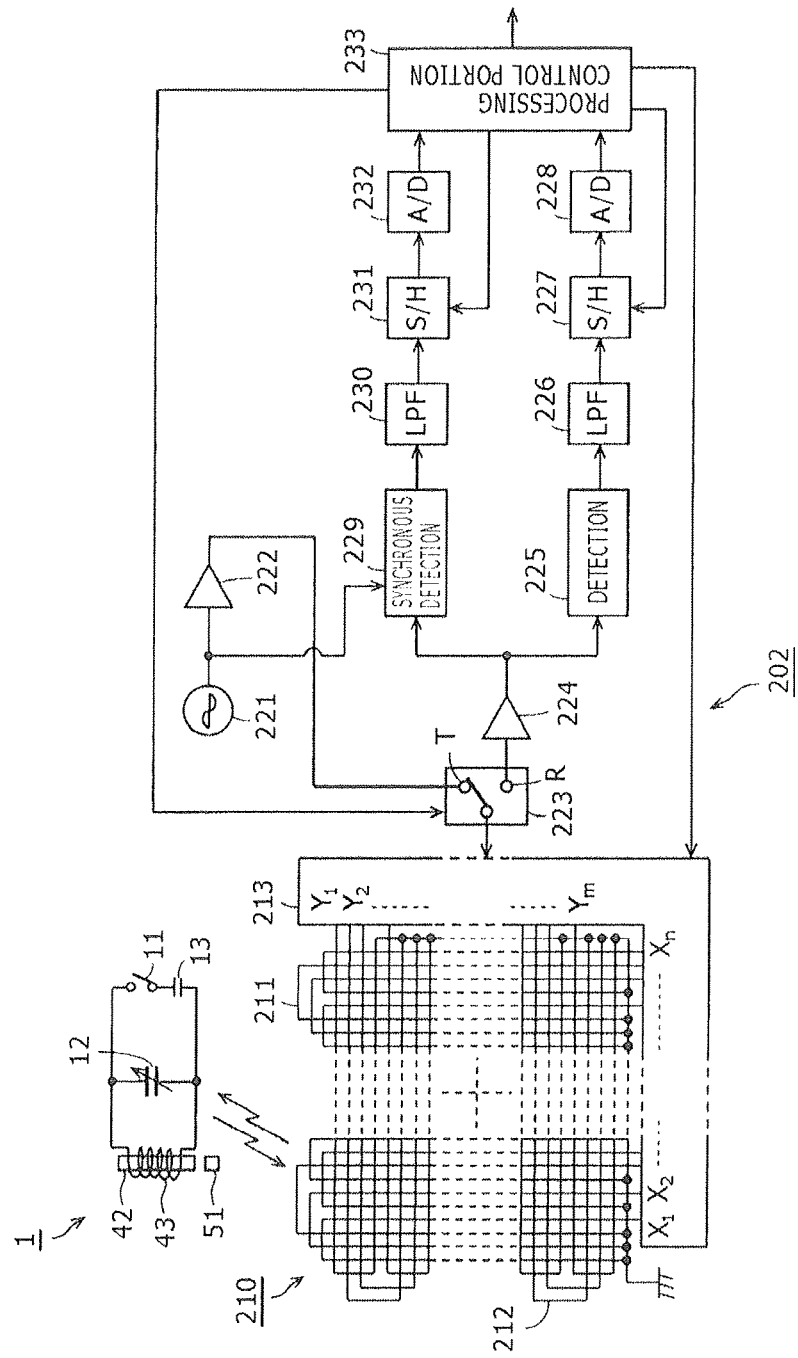
FIG. 3 is a block diagram, partly in circuit, of an example of the position indicator according to the first embodiment of the present invention, and the position detector shown in FIG. 2.

Next, with reference to FIG. 3, an example of a circuit configuration of the position detector 202 of the electronic apparatus 200 is described, which detects the indicated position of and the pen pressure applied to the pen-shaped position indicator 1 of the first embodiment described above. FIG. 3 is a block diagram, partly in circuit, showing an example of a circuit configuration of the pen-shaped position indicator 1, and the position detector 202 included in the electronic apparatus 200.

As previously stated, the pen-shaped position indicator 1 includes the resonance circuit composed of the position indicating coil 43 and the capacitors 12 and 13. The resonance circuit is configured in such a way that, as shown in FIG. 3, the position indicating coil 43 as the inductance element, and the trimming capacitor 12 composed of a chip component, are connected in parallel, and a series circuit of the push switch 11 and the capacitor 13 composed of a chip component is further connected in parallel with the position indicating coil 43 and the trimming capacitor 12.

In this case, the connection of the capacitor 13 to the parallel resonance circuit is controlled in accordance with an ON/OFF operation of the push switch 11, so that the resonance frequency is changed. As will be described later, the position detector 202 detects a change in the frequency by detecting a change in the phase of the signal supplied thereto from the pen-shaped position indicator 1, thereby detecting whether or not the push switch 11 has been pressed.

An X-axis direction loop coil group 211X, and a Y-axis direction loop coil group 212Y are layered on top of each other, thereby forming a position detecting coil in the position detector 202 of the electronic apparatus 200. The X-axis direction loop coil group 211X and the Y-axis direction loop coil group 212Y are composed of, for example, n rectangular loop coils and m rectangular loop coils, respectively. The loop coils composing the X-axis direction loop coil group 211X and the Y-axis direction loop coil group 212Y, respectively, are disposed in such a way that the loop coils are arranged at an equal interval and are superposed one upon another in order.

The position detector 202 is provided with a selection circuit 213, to which the X-axis direction loop coil group 211X and the Y-axis direction loop group 212Y are connected. The selection circuit 213 successively selects one of the loop coils of the X-axis direction loop coil group 211X, and one of the loop coils of the Y-axis direction loop coil group 212Y.

The position detector 202 is provided with an oscillator 221, a current driver 222, a switching connection circuit 223, a reception amplifier 224, a detector 225, a low-pass filter 226, a sample-and-hold circuit 227, an analog to digital (A/D) conversion circuit 228, a synchronous detector 229, a low-pass filter 230, a sample-and-hold circuit 231, an A/D conversion circuit 232, and a processing control portion 233. The processing control portion 233 is composed of a microcomputer.

The oscillator 221 generates an alternating-current (AC) signal having a frequency f0. The oscillator 221 supplies the AC signal thus generated to each of the current driver 222 and the synchronous detector 229. The current driver 222 converts the AC signal supplied thereto from the oscillator 221 into a current, which is in turn supplied from the current driver 222 to the switching connection circuit 223. The switching connection circuit 223 switches a connection destination (a transmission side terminal T or a reception side terminal R), to which the loop coil selected by the selection circuit 213 in accordance with the control provided by the processing control portion 233 is connected. With regard to the connection destination, the current driver 222 is connected to the transmission side terminal T, and the reception amplifier 224 is connected to the reception side terminal R.

An induced voltage generated in the loop coil selected by the selection circuit 213 is supplied to the reception amplifier 224 through both of the selection circuit 213 and the switching connection circuit 223. The reception amplifier 224 amplifies the induced voltage supplied thereto from the loop coil, and supplies the resulting voltage to each of the detector 225 and the synchronous detector 229.

The detector 225 detects an induced voltage generated in the loop coils, that is, a reception signal, and supplies the detected reception signal to the low-pass filter 226. The low-pass filter 226 has a cut-off frequency which is sufficiently lower than the frequency f0 described above, and converts the output signal supplied thereto from the detector 225 into a direct-current (DC) signal, and supplies the DC signal to the sample-and-hold circuit 227. The sample-and-hold circuit 227 holds a voltage value at a predetermined timing of the output signal from the low-pass filter 226, specifically, at a predetermined timing during a reception period of time, and supplies the voltage thus held to the A/D conversion circuit 228. The A/D conversion circuit 228 converts the analog output supplied thereto from the sample-and-hold circuit 227 into a digital signal and supplies the digital signal to the processing control portion 233.

On the other hand, the synchronous detector 229 synchronously detects the output signal supplied thereto from the reception amplifier 224 by using the AC signal supplied thereto from the oscillator 221, and supplies a signal set at a level corresponding to a phase difference between the output signal from the reception amplifier 224 and the AC signal from the oscillator 221 to a low-pass filter 230. The low-pass filter 230 has a cut-off frequency which is sufficiently lower than the frequency f0 described above, and converts the output signal supplied thereto from the synchronous detector 229 into a DC signal and supplies the DC signal to the sample-and-hold circuit 231. The sample-and-hold circuit 231 holds a voltage value at a predetermined timing of the output signal from the low-pass filter 230, and supplies the voltage thus held to the A/D conversion circuit 232. The A/D conversion circuit 232 converts the analog output supplied thereto from the sample-and-hold circuit 231 into a digital signal and supplies the digital signal to the processing control portion 233.

The processing control portion 233 controls operations of the respective portions of the position detector 202. That is to say, the processing control portion 233 controls the operation for selecting the loop coil in the selection circuit 213, the switching operation of the switching correction circuit 223, and the timings of the sample-and-hold circuits 227 and 231. The processing control portion 233 transmits the electric wave from the X-axis direction loop group 211 and the Y-axis direction loop group 212 for a given transmission duration time based on input signals supplied thereto from the A/D conversion circuits 228 and 232.

Induced voltages are generated in the loop coils of the X-axis direction loop group 211 and the Y-axis direction loop group 212 by the electric wave transmitted from the pen-shaped position indicator 1. The processing control portion 233 calculates coordinate values of the position in the X-axis direction and the Y-axis direction indicated by the pen-shaped position indicator 1 based on levels of voltage values of the induced voltages generated in the loop coils. In addition, the processing control portion 233 detects whether or not the push switch 11 has been pressed based on the level of the signal corresponding to the difference in phase between the transmitted electric wave and the received electric wave.

In such a manner, in the position detector 202, it is possible for the processing control portion 233 to detect the position indicated by the position indictor 1, which comes close to the position detector 202. In addition, the position detector 202 detects the phase (frequency biasing) of the received signal, to thereby detect whether or not the pressing operation portion 16 of the pen-shaped position indicator 1 has been depressed.

Structure of Holder 3 and Structure of how Components are Held

Figures 4A, 4B, 4C:
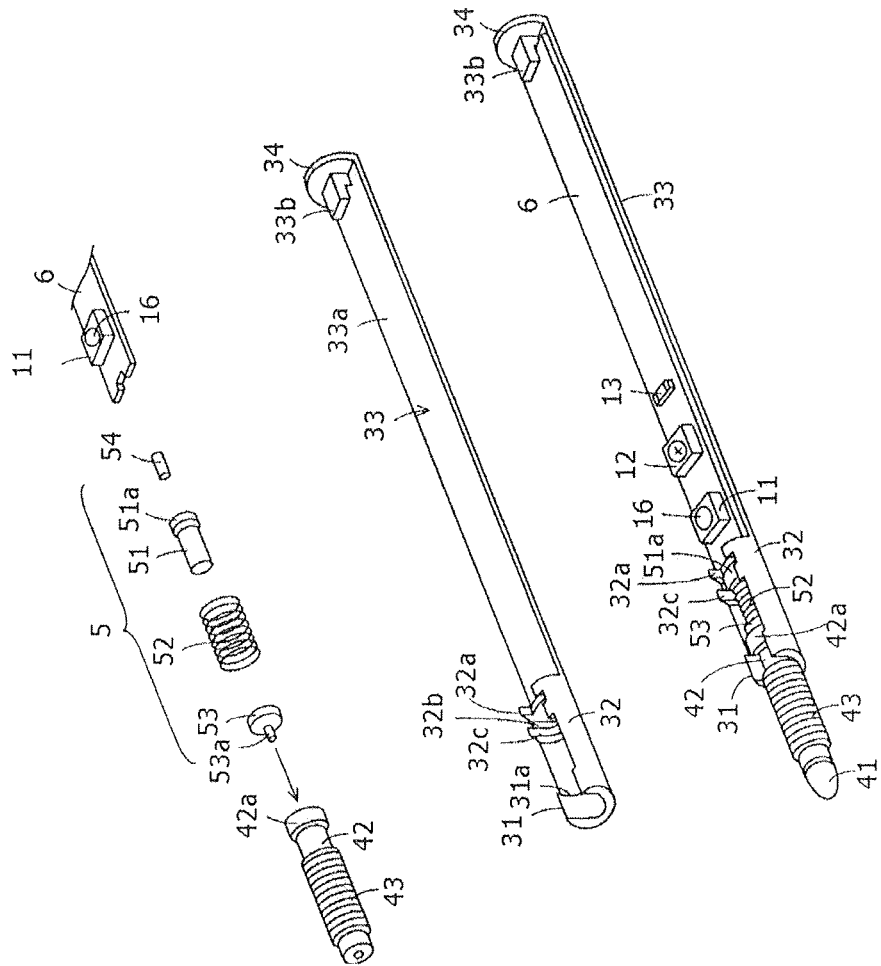
FIGS. 4A, 4B, and 4C respectively show a structure of main portions of the position indicator according to the first embodiment of the present invention.

FIGS. 4A to 4C respectively show a structure of the portions, which are accommodated inside of the case 2 of the pen-shaped position indicator 1. That is to say, FIG. 4B is a perspective view of the holder 3. FIG. 4A is an exploded view showing the components held by the holder 3 disposed in the axial direction of the case 2 in the order in which the components are held by the holder 3. Also, FIG. 4C is a perspective view showing a state in which the ferrite core 42, the pressure-sensitive component 5, and the printed wiring board 6 are arranged, held, and mounted in the holder 3.

As shown in FIG. 4A, the components held by the holder 3 are the ferrite core 42 (around which the position indicating coil 43 is wound) of the core body 4, and the entire pressure-sensitive component 5. Also, in this case, the printed wiring board 6 is mounted on the holder 3.

The pressure-sensitive component 5 is arranged, with the pen tip side set as a base point, by disposing the silicon rubber 53, the coil spring 52, and the ferrite chip 51 in this order in the holder 3. It is noted that in FIG. 4A, as will be described later, a rod-like member 54 disposed adjacent to the ferrite chip 51 is used as an engaging member for engaging the ferrite chip 51 of the pressure-sensitive component 5 with the holder 3 in a state in which the center line position of the ferrite chip 51 agrees with the center line position of the holder 3.

As shown in FIG. 4B, the holder 3 includes an opening portion (32) that opens in a direction perpendicular to the axial direction of the case 2, which is obtained by partially cutting out the cylinder corresponding to the hollow portion of the case 2 along the axial direction. A core body engaging portion 31 is formed in an end portion of the holder 3 corresponding to the side of the core body 4. The holder 3 has the opening portion (32) described above adjacent to the core body engaging portion 31. Thus, the component disposing portion 32, in which the pressure-sensitive component 5 is disposed through the opening portion, is formed in the holder 3. As shown in FIG. 4B, the core body engaging portion 31 and the component disposing portion 32 include a peripheral side surface that spans for at least a 180-degree angle range, or more, of the cylinder corresponding to the hollow portion of the case 2.

An end portion 34 of the holder 3, on the side of the cover body 17, is formed as a circular wall portion to close the cylinder corresponding to the hollow portion of the case 2. The printed wiring board mounting portion 33 is formed between the end portion 34 of the holder 3, and the component disposing portion 32. The printed wiring board mounting portion 33 includes an elongated mounting flat surface 33a corresponding to the shape of the elongated printed wiring board 6. Also, an engaging portion 33b, which clamps the elongated printed wiring board 6 on the elongated mounting flat surface 33a by engagement to thereby hold the elongated printed wiring board 6, is formed in the end portion 34. A length in a longitudinal direction of the elongated mounting flat surface 33a of the printed wiring board mounting portion 33 is set so as to be approximately equal to or slightly longer than that in the longitudinal direction of the elongated printed wiring board 6.

Figure 5A:
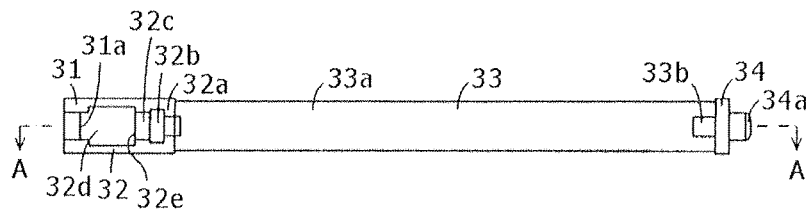
FIGS. 5A to 5E respectively show a structure of main portions of the position indicator according to the first embodiment of the present invention.
Figure 5B:
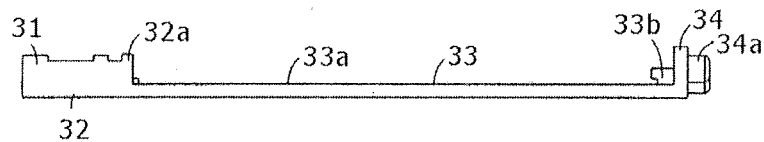
Figure 5C:
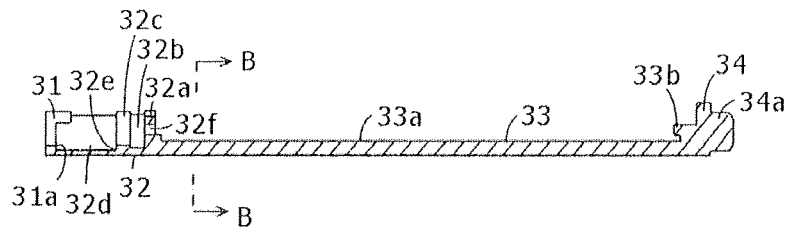
Figure 5D:
Figure 5E:

FIGS. 5A to 5E respectively show an example of a structure of the holder 3. FIG. 5A is a top plan view when the holder 3 is viewed from a direction perpendicular to the elongated mounting flat surface 33a of the printed wiring board mounting portion 33. FIG. 5B is a side elevational view when the holder 3 is viewed in a direction horizontal with the elongated mounting flat surface 33a of the printed wiring board mounting portion 33. FIG. 5C is a cross sectional view taken along line A-A of FIG. 5A. FIG. 5D is a view when the holder 3 is viewed in the axial direction from the end portion 34 side of the side elevational view of FIG. 5B. Also, FIG. 5E is a cross sectional view taken along line B-B of FIG. 5C.

Figure 6:
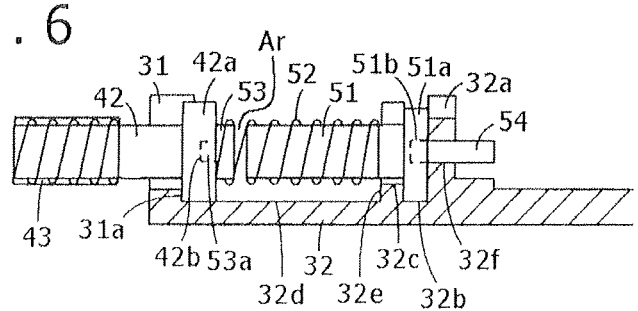
FIG. 6 is a partial side elevational view of a structure of main portions of the position indicator according to the first embodiment of the present invention.

FIG. 6 is a partial view showing a state in which the ferrite core 42 and the pressure-sensitive component 5 are accommodated and held in the core body holding portion 31 and the component disposing portion 32 of the holder 3, respectively. In FIG. 6, for the sake of clear illustration, the holder 3 is shown in the state of the cross sectional view of FIG. 5C.

As shown in FIGS. 4A to 6, an inner diameter of the core body engaging portion 31 is selected as being slightly larger than a diameter of the portion of the ferrite core 42, around which the position indicating coil 43 is wound. Although the component disposing portion 32 is formed adjacent to the core body engaging portion 31, a coupling portion of the component disposing portion 32 with the core body engaging portion 31 is structured so as to have a slightly larger inner diameter than an outer diameter of the guard portion 42a of the ferrite core 42. As a result, a stepped portion 31a is formed in the coupling portion between the core body engaging portion 31 and the component disposing portion 32.

As shown in FIG. 6, the ferrite core 42 engages with the core body engaging portion 31 such that its guard portion 42a is disposed on the component disposing portion 32 side with respect to the core body engaging portion 31. Thus, the presence of the stepped portion 31a prevents the ferrite core 42 from falling out of the holder 3 in the axial direction toward the pen tip side. In addition, the component disposing portion 32 has an opening through which to receive the guard portion 42a of the ferrite core 42, and the core body engaging portion 31 also holds the guard portion 42a of the ferrite core 42 for at least a 180-degree angle range, or more. For this reason, the ferrite core 42 is held such that its center line position aligns with the center line position of a virtual cylinder within the holder 3, in a manner not to fall out of the core body engaging portion 31 in a direction perpendicular to the axial direction.

The silicon rubber 53 of the pressure-sensitive component 5, as shown in FIG. 4A, includes a protrusion portion 53a. On the other hand, as shown in FIG. 6, the end surface of the guard portion 42a of the ferrite core 42 is provided with a concave hole 42b, into which the protrusion portion 53a of the silicon rubber 53 is fitted. The protrusion portion 53a of the silicon rubber 53 is press-fitted into the concave hole 42b of the guard portion 42a of the ferrite core 42, whereby the silicon rubber 53 is mounted to the end surface of guard portion 42a of the ferrite core 42. An outer diameter of the silicon rubber 53 is selected as smaller than a diameter of the end surface of the guard portion 42a of the ferrite core 42.

In the component disposing portion 32, the pressure-sensitive component 5 is held by the coil spring 52 in a state such that the end surface of the ferrite chip 51 defines a predetermined air gap Ar with respect to the silicon rubber 53 mounted to the end surface of guard portion 42a of the ferrite core 42, as shown in FIG. 6.

To this end, as shown in FIGS. 4A to 6, the component disposing portion 32 includes a wall portion 32a, which abuts against the end surface of the guard portion 51a of the ferrite chip 51 so as to prevent the component disposing portion 32 from being moved to the end surface 34 side in the axial direction. As will be described later, a through hole 32f through which the rod-like member 54 is inserted is formed in the wall portion 32a in the central position of a virtual cylindrical shape of the holder 3.

In the component disposing portion 32, for a distance from the wall portion 32a toward the core body engaging portion 31 side corresponding to the thickness of the guard portion 51a of the ferrite chip 51, a fitting concave portion 32b, whose inner diameter is equal to or slightly larger than the outer diameter of the guard portion 51a, is formed.

On the core body engaging portion 31 side adjacent to the fitting concave portion 32b, a stepped portion 32c, whose inner diameter is equal to or slightly larger than an outer diameter of a small diameter portion of the ferrite chip 51 excluding the guard portion thereof, is formed. Further, on the core body engaging portion 31 side adjacent to the stepped portion 32c, a coil disposing portion 32d is formed, whose inner diameter is equal to the diameter used to form the stepped portion 31a, which is slightly larger than the guard portion 42a of the ferrite core 42.

A length in the axial direction of the coil disposing portion 32d extends from the position of the stepped portion 31a for the core body engaging portion 31 to the position of the stepped portion 32e formed between the coil disposing portion 32d and the stepped portion 32c. Also, the length in the axial direction of the coil disposing portion 32d is set such that the pressure-sensitive component 5 can be held in a state in which the end surface of the ferrite chip 51 on the side opposite to the guard portion 51a defines the predetermined air gap Ar in the axial direction with respect to the silicon rubber 53 mounted to the end surface of the guard portion 42a of the ferrite core 42.

As shown in FIG. 6, the ferrite core 42, to which the silicon rubber 53 is mounted via the end surface of the guard portion 42a, is disposed on the side of the core engaging portion 31 of the coil disposing portion 32d. The guard portion 51a of the ferrite chip 51 is fitted into the fitting concave portion 32b of the component disposing portion 32, in a state in which the guard portion 51a of the ferrite chip 51 abuts against the wall portion 32a. The guard portion 51a cannot be moved in the axial direction due to the provision of a stepped portion formed between the fitting concave portion 32b and the stepped portion 32c.

The coil spring 52 has a larger winding diameter than the outer diameter of the silicon rubber 53. For this reason, as shown in FIGS. 1 and 6, one end side of the coil spring 52 in the elastic biasing direction abuts against the end surface of the guard portion 42a of the ferrite core 42 in a state in which the silicon rubber 53 is accommodated within the size of the winding diameter of the coil spring 52. On the other hand, the other end side of the coil spring 52 in the elastic biasing direction abuts against the stepped portion 32e formed between the stepped portion 32c and the coil disposing portion 32d. By operation of the coil spring 52, the ferrite core 42 is elastically biased toward the pen tip side, constantly, to be engagingly held in the core body engaging portion 31.

Note that, actually, a worker first fits and mounts the silicon rubber 53 to the ferrite core 42. Thereafter, the worker mounts the coil spring 52 to the small diameter portion of the ferrite chip 51, and temporarily couples the silicon rubber 53 mounted to the ferrite core 42 with the end surface of the ferrite chip 51 while inserting the silicon rubber 53 into the size of the winding diameter of the coil spring 52. In this state, the worker inserts the silicon rubber 53 mounted to the ferrite core 42 into the component disposing portion 32 of the holder 3 through its opening portion. In this case, the silicon rubber 53 is inserted into the size of the winding diameter of the coil spring 52 in such a way that the guard portion 51b of the ferrite chip 51 is fitted into the fitting concave portion 32b, and the coil spring 52 abuts against both of the end surface of the guard portion 42a of the ferrite core 42, and the stepped portion 32e formed between the stepped portion 32c and the coil disposing portion 32d.

Then, in a state in which those components are inserted into the component disposing portion 32, by operation of the coil spring 52, the ferrite core 42 is elastically biased to the core body engaging portion 31 side constantly. As a result, as shown in FIGS. 1 and 6, the ferrite core 42 is held in a state in which the air gap Ar is defined between the silicon rubber 53 and the end portion of the small diameter portion of the ferrite chip 51.

Also, as shown in FIGS. 1 and 6, the concave hole 51b is formed in the central portion of the end surface of the guard portion 51a of the ferrite chip 51, and the rod-like member 54 is fitted into the concave hole 51b through the through hole 32f of the wall portion 32a. As a result, the ferrite chip 51 is held in such a way that the center line position thereof agrees with the center line position of the virtual cylinder of the holder 3.

As previously stated, the ferrite core 42 is held by the core body engaging portion 31 in such a way that the center line position thereof agrees with the center line position of the virtual cylinder of the holder 3. Therefore, all of the center line positions of the components disposed in the component disposing portion 32 agree with the center line position of the virtual cylinder of the holder 3.

The printed wiring board 6 is mooted on the mounting flat surface 33a of the printed wiring board mounting portion 33 of the holder 3. An end edge of the printed wiring board 6 on the end portion 34 side is clamped and engaged by the engaging portion 33b provided in the end portion 34 of the holder 3, and another end edge of the printed wiring board 6 on the component disposing portion 32 side is clamped by the rod-like member 54.

In the manner described above, both of the ferrite core 42, around which the position indicating coil 43 is wound, and the pressure-sensitive component 5 is held by the holder 3. Also, in the state in which the printed wiring board 6 is mounted on and engaged with the holder 3, the protrusion member (the pen tip member) 41 of the core body 4 is further mounted to the tip of the ferrite core 42. In addition, the holder 3 is inserted into the hollow portion of the case 2. Finally, the case 2 is closed by the cover body 17. When the case 2 is closed, the protrusion portion 34a formed in the end portion 34 of the holder 3 is fitted into the concave portion 17a of the cover body 17, and the holder 3 is engaged within the case 2 in a state in which the center line position of the holder 3 agrees with the center line position of the case 2 having a cylindrical shape.

When the pressing pressure (pen pressure) is applied to the protrusion member 41 forming the pen tip by a user of the pen-shaped position indicator 1, the end surface of the guard portion 42a of the ferrite core 42, to which the protrusion member 41 is coupled, is biased toward the ferrite chip 51 side against the biasing force of the coil spring 52 in correspondence to the pressing force. Then, in response thereto, the inductance of the position indicating coil 43 is changed, and thus the phase (resonance frequency) of the electric wave transmitted from the position indicating coil 43 of the resonance circuit is changed accordingly.

When the pressing force applied to the protrusion member 41 is further increased, the end surface of the ferrite chip 51 is brought into contact with the silicon rubber 53 to elastically bias the silicon rubber 53. As a result, the inductance of the position indicating coil 43 is changed in accordance with the change characteristics corresponding to the modulus of elasticity of the silicon rubber 53, and thus the phase (resonance frequency) of the electric wave transmitted from the position indicating coil 43 of the resonance circuit is changed.

It is noted that in the first embodiment of the present invention, the modulus of elasticity of the coil spring 52 is made smaller than that of the silicon rubber 53. That is to say, when k1 is the modulus of elasticity of the coil spring 52, and k2 is the modulus of elasticity of the silicon rubber 53, a relationship of $k1<k2$ holds. Therefore, the coil spring 52 is elastically deformed by a smaller pressing pressure than that for the silicon rubber 53. Thus, the silicon rubber 53 is not elastically deformed unless the pressing pressure larger than that for the coil spring 52 is applied.

In the pen-shaped position indicator 1 structured in the manner as described above, both of the coil spring 52 and the silicon rubber 53 are interposed between the ferrite core 42 and the ferrite chip 51. As a result, since the ferrite core 42 is pulled away from the ferrite chip 51 by mainly the operation of the coil spring 52, even when the pen tip side of the pen-shaped position indicator 1 is pointed upward, the ferrite core 42 and the ferrite chip 51 are prevented from coming close to each other. Therefore, even when the pen-shaped position indicator 1 is handled in such a way that the protrusion member 41 is directed upward, erroneous detection of a pressing pressure is prevented.

In addition, by operations of the coil spring 52 and the silicon rubber 53, it is possible to widen the detection range of the pressing pressure (pen pressure) applied to the core body 4 composed of the protrusion member 41 and the ferrite core 42. Furthermore, the electric wave whose phase (frequency) is suitably changed in correspondence to the pressing pressure can be transmitted to the position detector 202 and thus the detection of the pressing pressure (pen pressure) can be properly carried out.

It is noted that although in the first embodiment of the present invention, the description has been given based on the assumption that the silicon rubber 53 is provided on the end surface of the guard portion 42a of the ferrite core 42, the present invention is by no means limited to this structure. That is to say, the silicon rubber 53 may be provided on the end surface of the ferrite chip 51 facing the end surface of the ferrite core 42.

Since the pen-shaped position indicator 1 of the first embodiment described above is structured in such a way that all of the components accommodated in the case 2 are held by the holder 3, and the pressure-sensitive component 5 undergoes the elastic biasing force in the component disposing portion 32 of the holder 3, the elastic biasing force is prevented from being applied to the case 2. For this reason, even when the components are accommodated in the holder 3 and adjusted, and the holder 3 is then accommodated in the case 2, it is not necessary to carry out readjustment of the components. In addition, even when the pen-shaped position indicator 1 is placed in a severe condition such as a long usage or a high-temperature state, the case 2 can be prevented from being deformed into a banana-like shape.

In addition, the components are merely disposed side by side in the holder 3 along the axial direction, whereby the components can be held in the holder 3 in the state in which the center line position of the case 2 is aligned with each of the center line positions of the components. Also, in that state, the components can be handled as if the components are modularized. Therefore, work efficiency in manufacture of the present indicator 1 is improved.

Further, in the first embodiment described above of the present invention, the pressure-sensitive component is not formed in the form of a modularized component, but is merely disposed in the holder 3. Therefore, a thin type of the pen-shaped position indicator 1 can be achieved by simply miniaturizing respective components.

Note that, in the first embodiment described above of the present invention, in the core body engaging portion 31 and the component disposing portion 32 of the holder 3, the individual components are inserted from the opening portions corresponding to the outer diameters of the individual components, respectively. However, when the holder 3 is made of a material, such as a resin having elasticity, the opening portions whose sizes are smaller than the outer diameters of the individual components, respectively, may be provided. In this case, insertion of the individual components can be carried out by elastically biasing the holder 3, and after completion of the insertion of the individual components, the return of the elasticity serves to prevent the individual components from deviating from their respective positions in the axial direction.

Second Embodiment

In the first embodiment of the present invention described above, the holder 3 has the shape which is obtained by partially cutting out the cylinder corresponding to the hollow portion of the case 2 along the axial direction, and the cut-out portion is held as the opening portion. With the case of the holder 3 having such a structure, there is no problem as long as the worker accommodates the ferrite core 42, the pressure-sensitive component 5, and the printed wiring board 6 in the holder 3, and without interruption places the holder 3 in the case 2.

However, when the work is carried out in such a way that the ferrite core 42, the pressure-sensitive component 5, and the printed wiring board 6 are assembled to be disposed and held in the holder 3, and then the resulting assembly is held to be inserted in the case 2 at a later time, the opening portions of the holder 3 cannot be dust proofed.

A second embodiment of the present invention is a modification of the first embodiment of the present invention to address this problem. In the second embodiment of the present invention, the same constituent elements as those in the first embodiment of the present invention are designated by the same reference numerals or symbols, respectively, and a description thereof is omitted here for the sake of simplicity.

Figure 7:
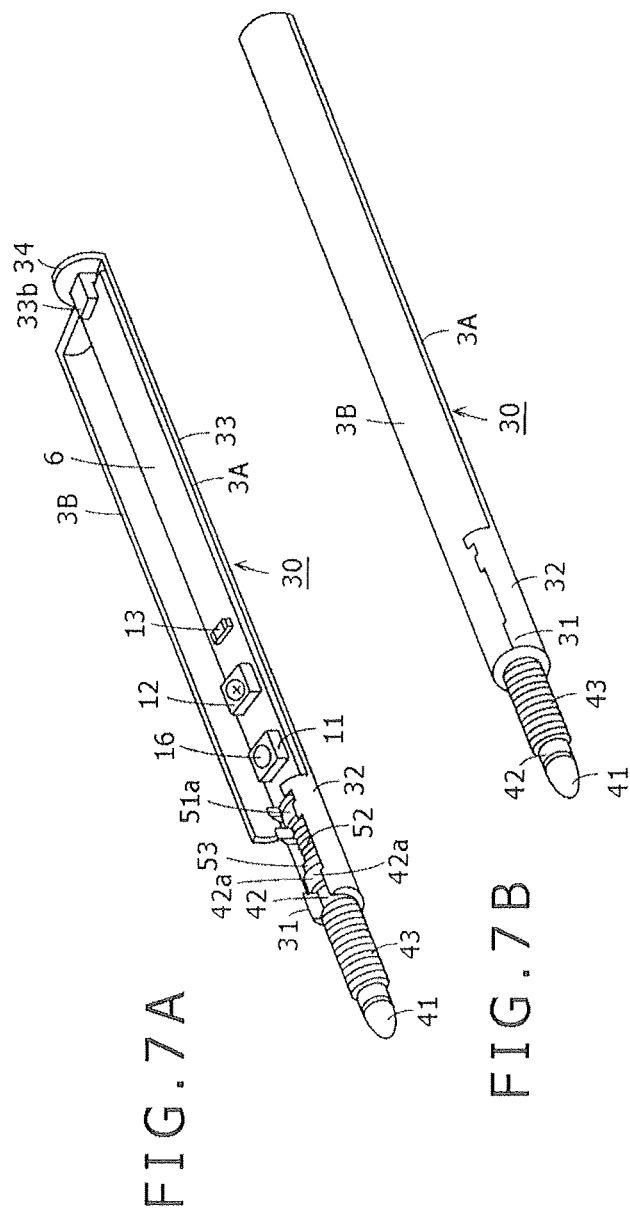
FIGS. 7A and 7B respectively show a structure of main portions of a position indicator according to a second embodiment of the present invention.

In the second embodiment of the present invention, as shown in FIGS. 7A and 7B, the cylinder corresponding to the hollow portion of the case 2 is divided into two parts along the axial direction, and thus the holder 30 in this embodiment is composed of a first holder 3A as a first accommodating portion, and a second holder 3B as a second accommodating portion. In the case of the second embodiment of the present invention, the first holder 3A and the second holder 3B are coupled to each other by a hinge provided along the axial direction. Alternatively, the first holder 3A and the second holder 3B may be arranged separately from each other.

In the case of the second embodiment of the present invention, the first holder 3A has substantially the same structure as that of the holder 3 described above, and the core body engaging portion 31, the component disposing portion 32, and the printed wiring board mounting portion 33 are formed in the first holder 3A. On the other hand, the second holder 3B is formed in the form of a portion corresponding to a portion which is obtained by removing the first holder 3A from the cylinder corresponding to the hollow portion of the case 2.

As shown in FIG. 7A, the ferrite core 42 and the pressure-sensitive component 5 are respectively disposed on the core body engaging portion 31 and the component disposing portion 32 of the first holder 3A, and the printed wiring board 6 is mounted on the printed wiring board mounting portion 33 of the first holder 3A, in the manner as described in the first embodiment described above. Thereafter, the opening portion of the first holder 3A is covered with the second holder 3B to be closed, thereby forming the cylinder corresponding to the hollow portion of the case 2, as shown in FIG. 7B. Note that, in the state of the cylinder, it is better that the first holder portion 3A and the second holder portion 3B are jointed to each other by an adhesive material or bonded to each other by an adhesive tape.

According to the second embodiment of the present invention, all of the internal components suited for achieving a thin position indicator can be accommodated in the cylindrical holder 30 and thus can be dust-proofed. In addition, the cylindrical holder 30 is structured in a cylindrical shape, which can be used as an independent component.

Note that, in the second embodiment described above of the present invention, all of the core body engaging portion, the component disposing portion, and the printed wiring board mounting portion are formed in only one of the first accommodating portion (first holder portion) and the second accommodating portion (second holder portion). However, of course, a structure may also be adopted such that the core body engaging portion, the component disposing portion, and the printed wiring board mounting portion are dividedly provided in the first accommodating portion and the second accommodating portion, as may be necessary in such a way that, for example, the printed wiring board mounting portion is provided in the second accommodating portion while the others are provided in the first accommodating portion.

Third Embodiment

Although the pressure-sensitive component in the position indicator according to each of the first and second embodiments of the present invention is of the type in which the change in the inductance is detected, the pressure-sensitive component may also be of the type in which the pressing pressure (pen pressure) applied to the core body is detected based on the change in a capacitance. In a third embodiment of the present invention, the pressure-sensitive component is of a type in which the pressing pressure is detected by detecting the change in a capacitance.

Figure 8:
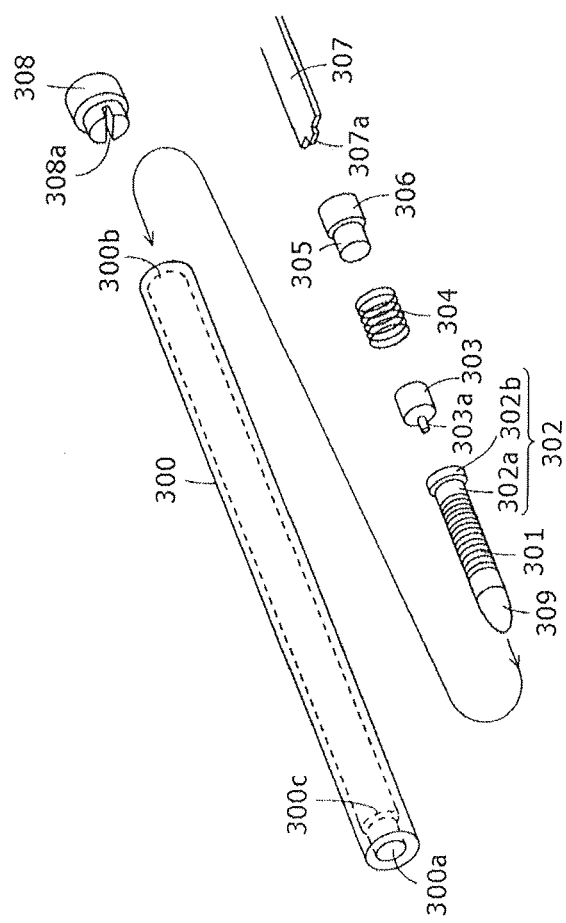
FIG. 8 is a view explaining a structure of main portions of a position indicator according to a third embodiment of the present invention.
Figure 9:
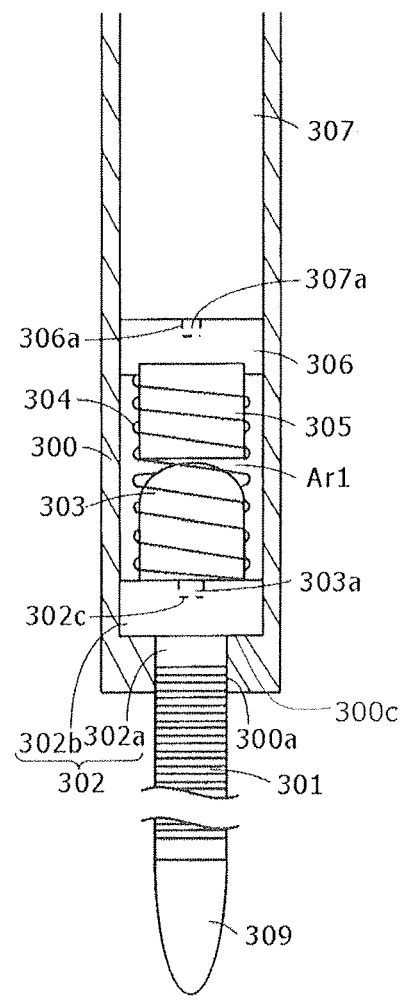
FIG. 9 is a view explaining a structure of main portions of the position indicator according to the third embodiment of the present invention.

FIG. 8 is a view showing a holder 300 and internal components thereof in a position indicator according to the third embodiment of the present invention. FIG. 9 is a view illustrating a state in which the internal components are accommodated in the holder 300. In the position indicator according to the third embodiment of the present invention, as shown in FIGS. 8 and 9, the holder 300 has a hollow-cylindrical shape. The holder 300 is also made of a resin, for example.

In the third embodiment of the present invention, an inner diameter of an opening portion 300a of the holder 300 on the pen tip side is set as a diameter R1 corresponding to a diameter of a small diameter portion 302a of a ferrite core 302, around which a position indicating coil 301 is wound. An inner diameter of an opening portion 300b of the holder 300 on the side opposite the pen tip side is set as a radius R2 (R2>R1) corresponding to an outer diameter of a guard portion 302b of the ferrite core 302.

In the holder 300, an inner diameter of a portion extending for a short distance from the opening portion 300a on the pen tip side is set as the diameter R1, and an inner diameter of the rest of the holder 300 is set as the radius R2 which is equal to that of the opening portion 300b. As a result, a stepped portion 300c is formed between the portion extending for a short distance from the opening portion 300a and the rest of the holder 300.

In the third embodiment of the present invention, the pressure-sensitive component is composed of an electric conductor 303 forming one electrode of a capacitor, a coil spring 304, a dielectric body 305, and an electric conductor 306 forming the other electrode of the capacitor. In the case of the third embodiment, the electric conductor 303 is composed of a conductive elastic body which can be elastically biased. The electric conductor 303 and the electric conductor 306 face each other through the dielectric body 305. In this case, as shown in FIG. 9, a surface of the electric conductor 303 facing the dielectric body 305 has a dome-like shape which bulges toward the dielectric body 305 side.

These components composing the pressure-sensitive component are inserted into the holder 300 in the order shown in the figure. The side of the opening portion 300b of the holder 300 is closed, for example, by a cover body 308 which, for example, accommodates therein a printed wiring board 307 in a groove 308a which extends through a center of the cover body 308. For inserting the components into the holder 300, the following procedure can be adopted. Firstly, the worker arranges the components on a tray for insertion, in the order of the insertion of the components into the holder 300. After that, a pressing operation machine pushes the components arranged on the tray for insertion, so that the components are automatically inserted into the hollow portion of the holder 300 in order.

With regard to the ferrite core 302 inserted into the holder 300, a small diameter portion 302a, around which the position indicating coil 301 is wound, protrudes from the opening portion 300a. A guard portion 302b of the ferrite core 302 is engaged with the stepped portion 300c within the hollow portion of the holder 300, whereby the ferrite core 302 is engaged within the hollow portion of the holder 300.

In the third embodiment of the present invention, a concave hole 302c, as shown in FIG. 9, is provided in the end surface of the guard portion 302b of the ferrite core 302. The electric conductor 303 includes a protrusion portion 303a which is fitted into the concave hole 302c. The protrusion portion 303a is fitted into the concave hole 302c, whereby the electric conductor 303 is mounted to the end surface of the guard portion 302b of the ferrite core 302.

A diameter of the electric conductor 303 is made identical to that of the dielectric body 305. Thus, as shown in FIG. 9, the electric conductor 303 and the dielectric body 305 are disposed in such a way that the end surfaces of the electric conductor 303 and the dielectric body 305 face each other through an air gap Ar1 created by operation of the coil spring 304.

In this case, a winding diameter of the coil spring 304 is made larger than each of the diameters of the electric conductor 303 and the dielectric body 305. Also, one end side of the coil spring 304 in the axial direction abuts against the end surface of the guard portion 302b of the ferrite core 302, and the other end side thereof abuts against the end surface of the electric conductor 306, into which the dielectric body 305 is fitted in a state in which both of the electric conductor 303 and the dielectric body 305 are accommodated in the wiring frame of the coil spring 304. A diameter of the electric conductor 306, as shown in FIG. 9, is set as the radius R2.

A concave portion 306a, as shown in FIG. 9, is formed in the end surface of the electric conductor 306 on the side opposite from a coupling portion with the dielectric body 305. A protrusion portion 307a, which is adapted to be fitted into the concave portion 306a, is formed in the end portion of the printed wiring board 307. Therefore, a position of the end portion of the printed wiring board 307 on the electric conductor 306 side is fixed based on the protrusion portion 307a being fitted into the concave portion 306a of the electric conductor 306, and the printed wiring board 307 is held in the holder 300.

Thus, in a state in which the individual components are accommodated in the holder 300, and the opening portion 300b side is closed by the cover body 308, as shown in FIG. 9, the electric conductor 303 and the electric conductor 306 are spaced away from each other by operation of the coil spring 304, and are held so as to face each other through both of the air gap Ar1 and the dielectric body 305.

In the case of the third embodiment, although an illustration is omitted here for the sake of simplicity, the electric conductor 303 and the electric conductor 306 are electrically connected to each other so as to be connected in parallel with the ferrite coil 301 in the printed wiring board 307.

Therefore, in the case of the third embodiment, when the pressing pressure is applied from the side of the protrusion member 309 forming the pen tip to the electric conductor 303 through the ferrite core 302, the end surface of the electric conductor 303, which bulges in the dome-like shape, is biased against the biasing force of the coil spring 304 to come close to and contact the end surface of the dielectric body 305. The end surface of the electric conductor 303 composed of a conductive elastic body, which bulges in the dome-like shape, comes in contact with the end surface of the dielectric body 305 with a contact area corresponding to the pressing pressure. For this reason, the capacity of the capacitor defined between the dielectric body 305 and the electric conductor 306 through the dielectric body 305 is changed.

Since in the third embodiment of the present invention, the capacitor is connected in parallel with the position indicating coil 301 to form the resonance circuit, the resonance frequency of the resonance circuit is changed so as to correspond to the capacity thus changed. That is to say, the phase (resonance frequency) of the electric wave transmitted from the position indicating coil 301 of the resonance circuit is changed accordingly.

In the third embodiment of the present invention also, the pressure-sensitive component is subjected to the elastic biasing force within the holder 300. Thus, when the holder 300 is accommodated in the case 2, the elastic biasing force is prevented from being applied as a stress to the case 2. In addition, in the third embodiment of the present invention, all of the components are inserted into and held in the holder 300 having a cylindrical shape in such a way that the center line positions of all of the components agree with one another within the holder 300.

Therefore, the position indicator according to the third embodiment of the present invention also offers the same effects as those of each of the position indicators according to the first and second embodiments of the present invention, and thus can be readily made thin.

Modifications to Third Embodiment

Figure 10:
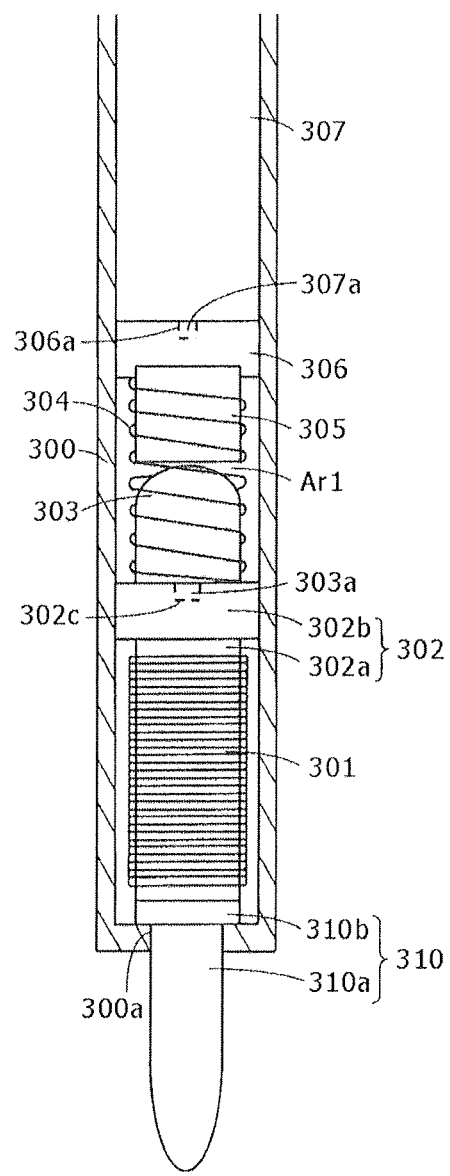
FIG. 10 is a view explaining a structure of main portions of a position indicator according to a modified third embodiment of the present invention.

In the third embodiment described above of the present invention, the position indicating coil 301, which is wound around the small diameter portion 302a of the ferrite core 302, protrudes from the opening portion 300a of the holder 300. However, another structure may be adopted such that the position indicating coil 301 is accommodated in the holder 300 in such a way that only a protrusion member coupled to the ferrite core 302 protrudes from the opening portion 300a of the holder 300 to the outside. FIG. 10 is a view showing an arrangement of the components within the holder 300 in such a case.

That is to say, in the case shown in FIG. 10, the protrusion member 310, which is fitted into the side opposite to the guard portion 302b of the ferrite core 302, has a shape including both of a guard portion 310b and a small diameter portion 310a. A diameter of the small diameter portion 310a of the protrusion member 310 is set slightly smaller than the inner diameter R1 of the opening portion 300a of the holder 300. In addition, an outer diameter of the guard portion 310b of the protrusion member 310 is set between the inner diameter R1 of the opening portion 300a of the holder 300 and the inner diameter R2 of the opening portion 300b.

When such a structure is adopted, as shown in FIG. 10, a state is obtained in which the guard portion 310b of the protrusion member 310 is engaged with the stepped portion on the side of the opening portion 300a of the holder 300, and thus only the small diameter portion 310a of the protrusion member 310 protrudes from the opening portion 300a to the outside. Other configurations are the same as those in the third embodiment described above of the present invention. Thus, in the modification to the third embodiment also, the same effects and operations as those in the third embodiment described above can be obtained.

In the case of the modification to the third embodiment, there is obtained a state in which the small diameter portion 310a of the protrusion member 310 protrudes as a so-called pen tip from the opening portion 300a of the holder 300. The case 2 of the position indicator (see FIG. 1) includes a stepped portion provided in the opening portion on the pen tip side. When the small diameter portion 310a of the protrusion member 310 protrudes from the holder 300 to the outside, the end surface of the opening portion 300a of the holder 300 is engaged with the stepped portion of the case 2 to be locked. Also, the case 2 is covered with a cover body 17 (see FIG. 1), whereby the holder 300 is regulated so as not to move in the axial direction of the case 2.

Thus, the holder 300 in which the individual components are accommodated and held can be used as a replacement lead for the case of the position indicator.

Fourth Embodiment

In a fourth embodiment of the present invention also, similarly to the case of the third embodiment of the present invention, a pressure-sensitive component is of a type in which a pressing pressure is detected based on a change in capacitance. In particular, in the fourth embodiment of the present invention, the pressure-sensitive component is composed of a semiconductor device called Micro Electro Mechanical System (MEMS). In the fourth embodiment of the present invention, the pressure-sensitive component is composed of a single capacitance type pressure sensing semiconductor device (hereinafter referred to as "a pressure sensing device").

In addition, although each of the position indicators of the first to third embodiments has the structure as a position indicator for an electromagnetic induction type position detector, the present invention can be applied in a position detector for a capacitance type position detector. The fourth embodiment of the present invention is directed to a position detector for the capacitance type position detector.

Figures 11A, 11B:
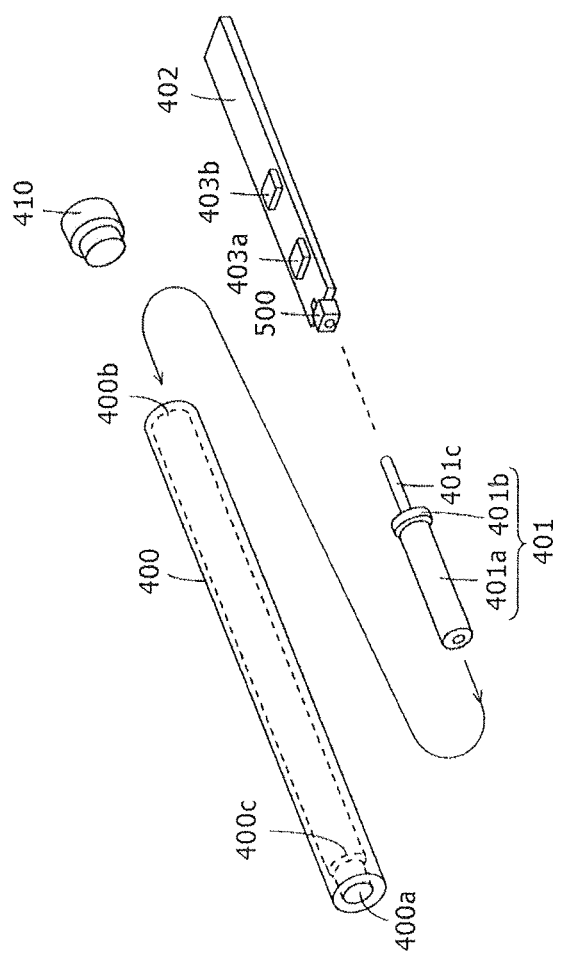
FIGS. 11A and 11B respectively show a structure of main portions of a position indicator according to a fourth embodiment of the present invention.

FIGS. 11A and 11B respectively show a holder 400, and internal components accommodated in the holder 400 in a position indicator according to the fourth embodiment of the present invention. In the fourth embodiment of the present invention also, the holder 400 is made of a resin, for example, and has a hollow cylindrical shape similarly to the case of the third embodiment of the present invention.

In the holder 400 according to the fourth embodiment of the present invention as well, an inner diameter of an opening portion 400a serving as a pen tip side is set as a diameter R11 corresponding to a diameter of a small diameter portion 401a of a core body 401 formed of an electric conductor. An inner diameter of an opening portion 400b of the holder 400 on a side opposite to the pen tip side is set as a diameter R12 (R12>R11) corresponding to an outer diameter of a guard portion 401b of the core body 401. It is noted that in the case of the fourth embodiment, a protrusion member (not shown) composed of an electric conductor is coupled to the core body 401. The core body 401 is electrically connected to a case composed of an electric conductor such as a conductive metal.

In the holder 400, an inner diameter of a portion extending for a short distance from an opening portion 400a on the pen tip side is set as a diameter R11, and an inner diameter of the rest of the holder 400 is set as a diameter R12, which is identical to that of the opening portion 400b. As a result, a stepped portion 400c is formed between the portion extending for a short distance from the opening portion 400a and the rest of the holder 400.

In the case of the fourth embodiment, a depressing member 401c for depressing a pressure sensing device 500 is formed in the core body 401. In the case of the fourth embodiment, the pressure sensing device 500 is provided on an end surface of a printed wiring board 402.

A width of the printed wiring board 402 is set slightly wider than the inner diameter R12 of the holder 400. As shown in a cross sectional view of FIG. 11B, grooves 400d and 400e are formed in an inner wall surface of the holder 400 to extend along the axial direction. Thus, both side edges in a longitudinal direction of the printed wiring board 402 are inserted into and held in the groves 400d and 400e, respectively.

In the fourth embodiment of the present invention, when the core body 401 is inserted into the hollow portion of the holder 400, the small diameter portion 401a of the core body 401 protrudes from the opening portion 400a to the outside. The guard portion 401b of the core body 401 is engaged with the stepped portion 400c provided within the hollow portion of the holder 400, whereby the core body 401 is associated within the holder 400.

A cover body 410 is fitted into the holder 400 so as to close the opening portion 400b side of the holder 400, whereby the depressing member 401c provided in the core body 401 abuts against the pressure sensing device 500 provided on the end surface of the printed wiring board 402. The printed wiring board 402 is provided with a circuit element 403a to detect a variable capacitance of the pressure sensing device 500 as, for example, a frequency change, and a circuit element 403b to transmit information on a pen pressure corresponding to the variable capacitance thus detected wirelessly by infrared wave, radio wave, or the like.

The holder 400, in which both of the core body 401 and the printed wiring board 402 are accommodated and held, is accommodated in a case of the position indicator.

When the depressing force is received in the position indicator through the protrusion member as the pen tip member mounted to the tip of the core body 401, the pressure sensing device 500 is depressed by the depressing force, so that the capacitance of the pressure sensing device 500 is changed. The circuit element 403a detects the capacitance thus changed, and the circuit element 403b supplies the information on the pen pressure corresponding to the capacitance detected by the circuit element 403a to the capacitance type position detector, wirelessly.

Figure 12:
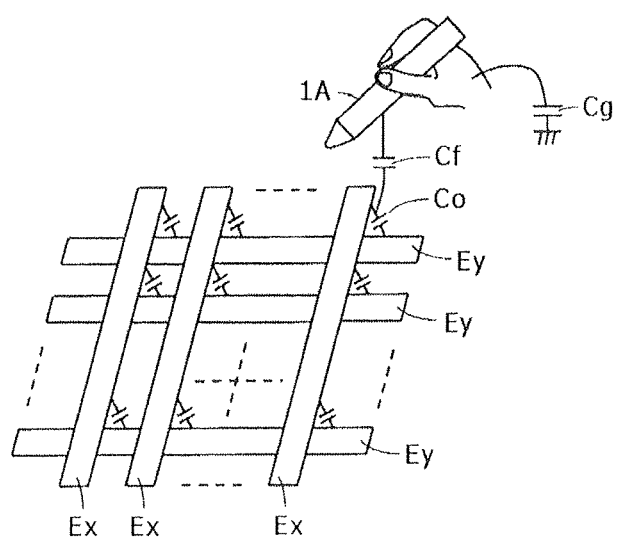
FIG. 12 illustrates an example of a capacitance type sensor used together with a position indicator according to the present invention.

An example of the capacitance type position detector used in the position indicator of the fourth embodiment is shown in FIG. 12. As shown in FIG. 12, a sensor portion of the capacitance type position detector in this example is structured in such a way that plural upper electrodes Ex extending in a Y-axis direction (in a vertical direction), for example, and plural lower electrodes Ey extending in an X-axis direction (in a horizontal direction), for example, are arranged on an indication input surface in the X-axis direction and in the Y-axis direction at predetermined intervals, respectively. The upper electrodes Ex and the lower electrodes Ey intersect each other perpendicularly and are laid out with a slight gap in between. In this case, a capacitor (fixed capacitor) having a predetermined capacitance Co is formed at each cross-point between the upper electrode Ex and the lower electrode Ey.

At a position on the indication input surface, where an indication body, such as a finger or a position indicator 1A held by a user, approaches or contacts, a capacitor having a capacitance Cf is formed between the electrodes Ex and Ey at this position and the indication body. Also, the indication body such as the position indicator 1A is connected to the ground through the human body and a predetermined capacitor having a capacitance Cg. As a result, due to the presence of the capacitances Cf and Cg, an amount of movement of electric charge accumulated between the upper electrode Ex and the lower electrode Ey is changed at the position indicated by the indication body. In the cross-point capacitance type position detector, the position which is indicated by the indication body such as the position indicator 1A within the indication input surface is specified by detecting the change in the amount of movement of the electric charge accumulated between the upper electrode Ex and the lower electrode Ey.

For example, the lower electrode Ey is used as a transmission electrode and a predetermined signal is transmitted to the transmission electrode; and the upper electrode Ex is used as a reception electrode and a current change in the received signal from the reception electrode is detected, thereby detecting the change in the amount of movement of the electric charge.

In this example, the position detector also includes a circuit for receiving information on a pen pressure transmitted from the position indicator wirelessly to thereby detect the pen pressure.

Next, an example of the pressure sensing device 500 in this example will now be described with reference to FIGS. 13A to 14C.

Figure 13A:
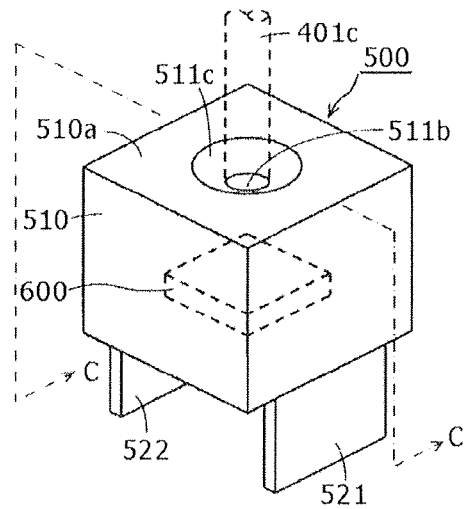
FIGS. 13A to 13C respectively show an example of a pressure-sensitive component used in the position indicator according to the fourth embodiment of the present invention.
Figure 13B:
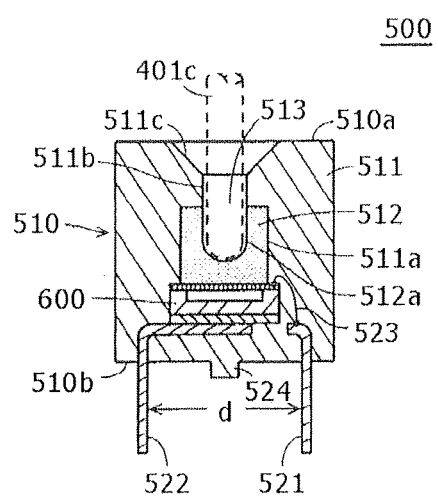
Figure 13C:
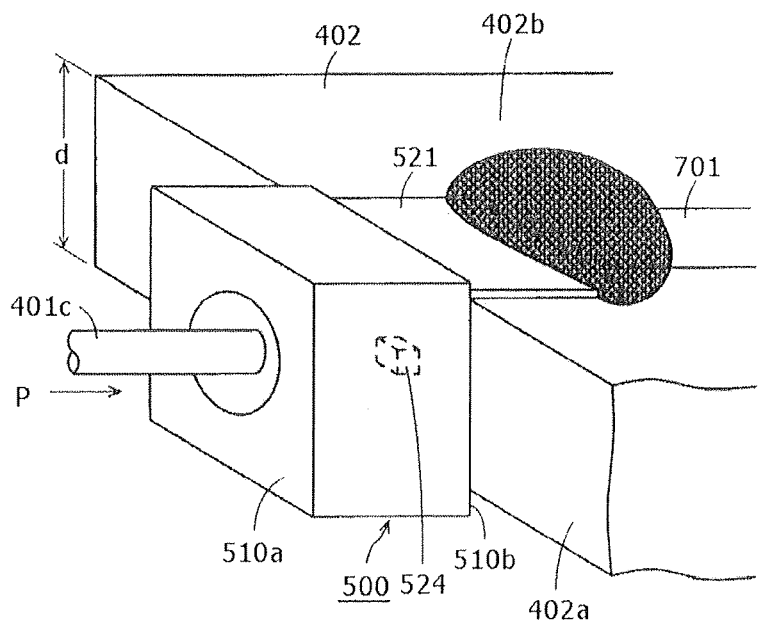

FIGS. 13A to 13C respectively show a structure of the pressure sensing device in this example. That is to say, FIG. 13A is a perspective view of the pressure sensing device in this example. FIG. 13B is a longitudinal cross sectional view taken along line C-C of FIG. 13A. FIG. 13C is a partial perspective view of the pressure sensing device 500 which, in this example, is mounted to the printed wiring board 402.

The pressure sensing device 500 in this example is manufactured in such a way that a pressure-sensitive chip 600 structured as a semiconductor device manufactured by utilizing the MEMS technique, for example, is encapsulated in a cube or a rectangular parallelepiped-like box type package 510 (see FIGS. 13A and 13B).

Figure 14A:
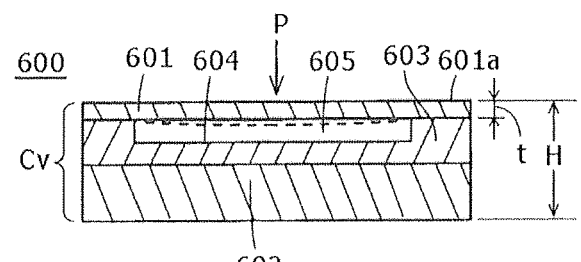
FIGS. 14A to 14C respectively show an example of the pressure-sensitive component used in the position indicator according to the fourth embodiment of the present invention.
Figure 14B:
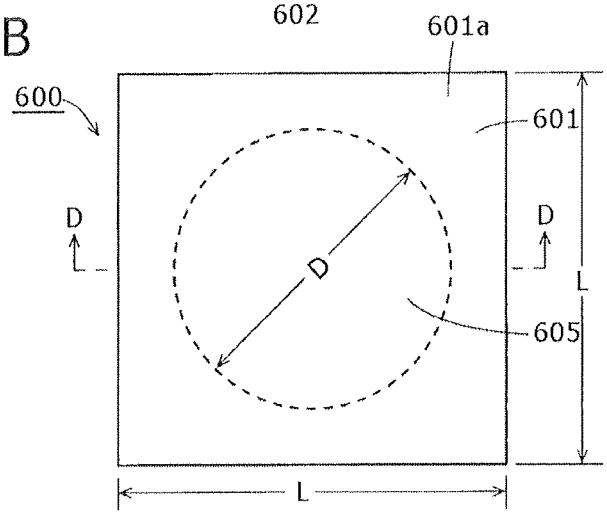

The pressure-sensitive chip 600 serves to detect a pressure applied thereto in the form of a change in capacitance. In this example, the pressure-sensitive chip 600 has a structure as shown in FIGS. 13A to 13C. FIG. 14B is a top plan view of the pressure-sensitive chip 600 in this example when viewed from a surface 601a side, which receives a pressure P. FIG. 14A is a longitudinal cross sectional view taken along line D-D of FIG. 14B.

Figure 14C:
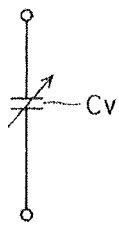
Figure 15:
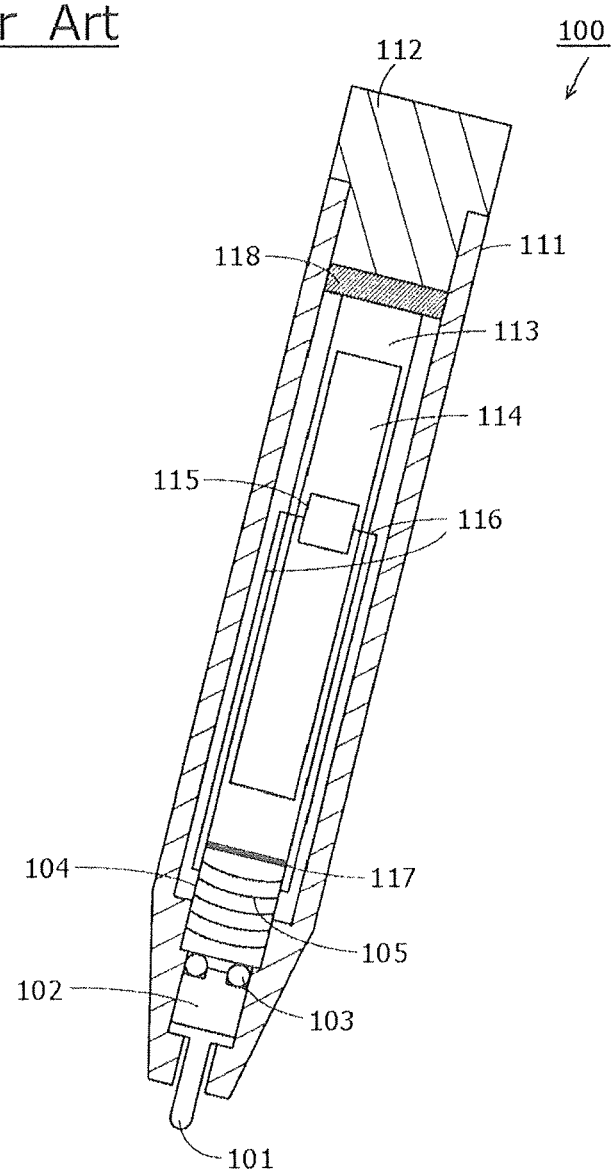
FIG. 15 is a cross sectional view of a structure of a conventional pen-type position indicator.

As shown in FIGS. 14A to 14C, the pressure-sensitive chip 600 in this example has a rectangular parallelepiped-like shape in which length×width×height=L×L×H. In this example, L=1.5 mm, and H=0.5 mm.

The pressure-sensitive chip 600 in this example is composed of a first electrode 601, a second electrode 602, and an insulating layer (dielectric layer) 603 between the first electrode 601 and the second electrode 602. In this example, each of the first electrode 601 and the second electrode 602 is composed of an electric conductor made of single crystal silicon (Si). The insulating layer 603, in this example, is made of a silicon oxide ($SiO_2$) film. It is noted that the insulating layer 603 needs not to be made of the oxide film, but may be made of any other suitable insulator.

In this example, a concave portion 604 having circular shape with a central position of the surface as a center is formed on a surface of the insulating layer 603 facing the first electrode 601. Due to the presence of the concave portion 604, a space 605 is defined between the insulating layer 603 and the first electrode 601. In this example, a bottom surface of the concave portion 604 is formed as a flat surface, and a radius R of the bottom surface of the circular concave portion 604 is set to 1 mm, for example. In addition, a depth of the concave portion 604 is set to the range of about several tens of micrometers to about a hundred micrometers.

The pressure-sensitive chip 600 in this example is made in a semiconductor process in the manner as will be described below. Firstly, the insulating layer 603 composed of the oxide film is formed on single crystal silicon forming the second electrode 602. Next, an annular mask having a radius R is formed on the insulating layer 603 composed of the oxide film, and etching is carried out with respect to the insulating layer 603, thereby forming the concave portion 604. Then, single crystal silicon composing the first electrode 601 is deposited on the insulating layer 603. As a result, the pressure-sensitive chip 600 is formed, which includes the space 605 under the first electrode 601.

When the first electrode 601 is depressed from the side of the surface 601a opposite to the surface facing the second electrode 602, the first electrode 601 can be deformed to be bent in the direction toward the space 605 due to the presence of the space 605. A thickness t of single crystal silicon as a sample material for forming the first electrode 601 is set as a thickness that permits the first electrode 601 to be bent by the pressure P applied to the pressure-sensitive chip 600. Thus, the first electrode 601 is set as being thinner than the second electrode 602. As will be described later, the thickness t of the first electrode 601 is selected in such a way to achieve desirable bending displacement characteristics of the first electrode 601 in response to the applied pressure P.

In the pressure-sensitive chip 600 having the structure as described above, a capacitor having a capacitance Cv is formed between the first electrode 601 and the second electrode 602. Also, as shown in FIG. 14A, when the pressure P is applied to the first electrode 601 from the side of an upper surface 601a of the first electrode 601 opposite to the surface facing the second electrode 602, the first electrode 601 is bent as indicated by a dotted line in FIG. 14A, and thus a distance between the first electrode 601 and the second electrode 602 becomes short, so that the value of the capacitance Cv is changed to become large. An amount of bending of the first electrode 601 is changed in accordance with the magnitude of the applied pressure P. Therefore, as shown in an equivalent circuit of FIG. 14C, the capacitance Cv becomes a variable capacitance, which is changed in accordance with the magnitude of the pressure P applied to the pressure-sensitive chip 600.

Note that, it was confirmed that single crystal silicon as a sample material for forming the first electrode 601 achieves bending by several micrometers in response to a pressure, and that this amount of bending due to the pressing pressure P causes a change in the capacitance Cv of 0 to 10 pF (picofarad).

In the pressure sensing device 500 in the fourth embodiment of the present invention, the pressure-sensitive chip 600 having the structure as described above is accommodated in a package 510 in a state in which the surface 601a of the first electrode 601 which receives the pressure applied thereto, as shown in FIGS. 13A and 13B, is parallel with the upper surface 510a of the package 510, and faces the upper surface 510a of the package 510.

The package 510 is composed of a package member 511 made of an electric insulating material such as a ceramic material or a resin material, and an elastic member 512 which is provided on the side of the surface 601a of the pressure-sensitive chip 600, which receives the pressure in the package member 511. The elastic member 512 is an example of a pressure transferring member.

In the example, a concave portion 511a is provided above the pressure-receiving surface 601a of the first electrode 601 of the pressure-sensitive chip 600 encapsulated within the package member 511. The concave portion 511a covers an area of the pressure-receiving portion of the pressure-sensitive chip 600. The elastic member 512 is filled in the concave portion 511a. That is to say, the elastic member 512 is arranged within the concave portion 511a of the package member 511 so as to be integrated with the package 510. In this case, the elastic member 512 is made of a silicon resin, especially, made of a silicon rubber.

A communication hole 513, which communicates from the upper surface 510a of the package 510 to a portion of the elastic member 512, is formed in the package 510. That is to say, a through hole 511b constituting a portion of the communication hole 513 is formed in the package member 511. Also, a concave hole 512a constituting a tip portion of the communication hole 513 is provided in the elastic member 512. In addition, a tapered portion 511c is formed on an opening portion side (on the upper surface 510a side) of the communication hole 513 of the package member 511, and the opening portion of the communication hole 513 has a funnel-like shape.

In FIGS. 13A and 13B, as indicated by a dotted line, the depressing member 401c provided in the core body 401 (see FIG. 11A) is inserted into the pressure sensing device 500 through the communication hole 513. In this case, the pressure P applied from the outside is applied in the axial direction (in the center line direction) of the depressing member 401c.

It is noted that in the example, a diameter of the through hole 511b is set as being slightly larger than that of the depressing member 401c, and a diameter of the concave hole 512a is set as being slightly smaller than that of the depressing member 401c.

Since the opening portion of the communication hole 513 has the funnel-like shape, the depressing member 401c is guided by the tapered portion 511c of the opening portion of the communication hole 513, and is readily introduced and inserted into the communication hole 513. Also, the depressing member 401c is pushed into the inside of the concave hole 512a of the elastic member 512 at the end portion of the communication hole 513. In such a manner, the depressing member 401c is inserted into the communication hole 513 of the pressure sensing device 500, to be thereby positioned to apply the pressure P in the axial direction to the pressure-receiving surface side of the pressure-sensitive chip 600.

In this case, since the diameter of the concave hole 512a is slightly smaller than that of the depressing member 401c, the depressing member 401c is elastically held in the concave hole 512a of the elastic member 512 by the elastic member 512. In other words, when the depressing member 401c is inserted into the communication hole 513 of the pressure sensing device 500, the depressing member 401c is held by the pressure sensing device 500. The depressing member 401c is drawn out from the communication hole 513 by using a predetermined force, thereby making it possible to release the holding state by the pressure sensing device 500.

As shown in FIGS. 13A and 13B, a first lead terminal 521 connected to the first electrode 601 of the pressure-sensitive chip 600 is derived from the package member 511 of the pressure sensing device 500, and a second lead terminal 522 connected to the second electrode 602 of the pressure-sensitive chip 600 is also derived from the package member 511 of the pressure sensing device 500. The first lead terminal 521 is electrically connected to the first electrode 601 by, for example, a gold wire 523. In addition, the second lead terminal 522 is derived from the package member 511 of the pressure sensing device 500 in a state in which the second lead terminal 522 contacts the second electrode 602, thereby being electrically connected to the second electrode 602. Of course, alternatively, the second lead terminal 522 and the second electrode 602 may be electrically connected to each other by a gold wire or the like.

In the example, each of the first and second lead terminals 521 and 522 is made of a conductive metal, and as shown in FIG. 13A, is formed to have a large width. In the example, the first and second lead terminals 521 and 522 are derived from a bottom surface 510b parallel with the upper surface 510a of the package 510 in a direction perpendicular to the bottom surface 510b, and are also derived so as to face each other at an interval corresponding to a thickness d of the printed wiring board 402.

As shown in FIG. 13C, the pressure sensing device 500 is disposed in such a way that a thickness direction of the printed wiring board 402 is clamped between the first and second lead terminals 521 and 522 in a state in which the bottom surface 510b of the package 510 is brought into contact with the end surface 402a of the printed wiring board 402.

A printed pattern 701 provided on a first surface 402b of the printed wiring board 402, and the first lead terminal 521, are fixed to each other by soldering. In addition, although an illustration is omitted here for the sake of simplicity, similarly to the above, a printed pattern provided on a second surface of the printed wiring board 402 opposite to the first surface 402b, and the second lead terminal 522, are fixed to each other by soldering. It is noted that when a signal processing circuit (for example, composed of an IC) is provided on the side of the first surface 402b of the printed wiring board 402, since the printed pattern to which the second lead terminal 522 is soldered is provided on the second surface of the printed wiring board 402 opposite to the first surface 402b, the printed pattern is connected to the printed pattern on the side of the first surface 402b via a through hole of the printed wiring board 402 to be connected to the signal processing circuit.

In this state, as shown in FIG. 13C, when the depressing force P is applied to the depressing member 401c in the axial direction of the depressing member 401c, the pressure corresponding to the pressing pressure P is applied to the pressure-receiving surface side of the pressure-sensitive chip 600, which is adapted to receive the pressure through the elastic member 512. As previously stated, the value of the capacitance Cv of the capacitor of the pressure-sensitive chip 600 is set corresponding to the pressure. Therefore, the signal processing circuit provided in the printed wiring board 402 carries out a signal processing operation corresponding to the value of the capacitance Cv.

In this case, as shown in FIG. 13B, on the side of the pressure-receiving surface 601a of the pressure-sensitive chip 600, the pressure is applied to the entire surface 610a by the elastic member 512. Thus, the pressure corresponding to the pressing pressure P is efficiently applied to the pressure-sensitive chip 600, and the pressure-sensitive chip 600 desirably exhibits the capacitance Cv corresponding to the pressing pressure P.

In this case, since the pressure-receiving surface of the pressure-sensitive chip 600 is not directly depressed by the depressing member 401c, but the elastic member 512 is interposed between the depressing member 401c and the pressure-sensitive chip 600, a pressure resistance property of the pressure-receiving surface side of the pressure-sensitive chip 600 is enhanced, and thus the surface side can be prevented from being damaged by the pressure. That is to say, since in the pressure sensing device 500, the pressure based on the pressing pressure P applied from the outside is received by the pressure-sensitive chip 600 through the elastic member 512 serving as a pressure transmitting member, it is possible to increase the pressure resistance property of the pressure-sensitive chip 600 against the applied pressure.

In addition, the depressing member 401c is inserted into the communication hole 513 provided in the package 510 of the pressure sensing device 500 to be precisely positioned, and thus the pressure applied by the depressing member 401c is reliably applied to the pressure-sensitive chip 600 through the elastic member 512.

The pressing pressure applied through the pressing member 401c is transferred in the form of a pressure, which is applied to the entire surface 601a of the first electrode 601 of the pressure-sensitive chip 600, by the elastic member 512. Therefore, the pressing pressure applied through the depressing member 401c is efficiently applied to the pressure-receiving surface 601a of the pressure-sensitive chip 600, and thus the value of the capacitance Cv of the capacitor of the pressure-sensitive tip 600 exhibits a change which quickly responds to the pressing pressure P. In other words, the pressure sensing device 500 in the fourth embodiment exhibits a change in the capacitance which quickly responds to the pressing pressure P, and when the pressure sensing device 500 is used for detection of the pen pressure, the pen pressure can be reliably detected.

In the fourth embodiment of the present invention also, after the core body 401 has been inserted into the holder 400, the pressure sensing device 500 is inserted into the holder 400, whereby the depressing member 401c provided in the core body 401 is held so as to be inserted into the communication hole 513 of the pressure sensing device 500 provided on the end edge 402a of the printed wiring board 402.

The pressure sensing device 500 in this example, as described above, is very small and thus it is easy to make the position indicator thinner. Also, the fourth embodiment of the present invention offers a merit in that the structure is very simple.

It is noted that although the fourth embodiment of the present invention described so far is directed to a case where the present invention is applied to the capacitance type position indicator, it goes without saying that the structure in which the pressure sensing device 500 is used as a pressure-sensitive component can be similarly applied to the position indicator for an electromagnetic induction type position detector. That is to say, for example, the pressure sensing semiconductor device 500 described above may be used as a part of the capacitor forming a resonance circuit included in the position indicator, which is used together with the electromagnetic induction type position detector, whereby the pen pressure can be detected as a change in the resonance frequency of the resonance circuit.

Other Embodiments and Modifications

In each of the descriptions of the embodiments described above of the present invention, the holder is made of resin. However, the material forming the holder is by no means limited to resin, and thus any material may be used for the holder as long as it is a insulating material.

In addition, although in each of the embodiments described above of the present invention, the position indicator is used for a position detector mounted on a cellular phone unit, the electronic apparatus, to which a position detector used with a position indicator of the present invention is mounted, is by no means limited to a cellular phone unit, and may be other various kinds of electronic apparatuses such as a pad-type mobile terminal and a pad-type personal computer.

What is claimed is:
1. A position indicator, comprising:
a cylindrical chassis;
a core body, which is disposed within the cylindrical chassis such that a tip thereof protrudes from a distal opening end of the cylindrical chassis;
a printed wiring board, which is disposed within the cylindrical chassis and which is provided with a circuit element to detect a pressing pressure applied to the tip of the core body;
one or more pressure-sensitive components configured to detect a displacement of the core body, in an axial direction of the cylindrical chassis, corresponding to the pressing pressure applied to the tip; and
a holder, which is accommodated within a hollow portion of the cylindrical chassis with its longitudinal direction being aligned with the axial direction of the cylindrical chassis,
wherein the holder includes:
a core body engaging portion configured to hold the core body and to regulate movement of the core body in a direction toward the tip;
a component disposing portion, which defines an opening portion that opens in a direction perpendicular to the axial direction and in which the one or more pressure-sensitive components are arranged in the axial direction so as to receive the pressing pressure applied to the core body; and a printed wiring board mounting portion, which is engaged with the printed wiring board to mount the printed wiring board thereon with a longitudinal direction of the printed wiring board being aligned with the axial direction, and wherein the holder that secures therein the core body, the printed wiring board, and the one or more pressure-sensitive components is accommodated in the cylindrical chassis, whereby the pressing pressure applied to the core body is received by the holder to prevent the pressing pressure from being directly applied to the cylindrical chassis.

2. The position indicator according to claim 1, wherein the core body and the one or more pressure-sensitive components are held by the core body engaging portion and the component disposing portion, respectively, such that central positions of the core body and the one or more pressure-sensitive components are aligned along the axial direction; and the pressing pressure from the core body is detected by the circuit element on the printed wiring board.

3. The position indicator according to claim 2, wherein the holder is made of a resin material, and the core body and the one or more pressure-sensitive components are elastically held by the core body engaging portion and the component disposing portion, respectively, of the holder.

4. The position indicator according to claim 2, wherein the holder is accommodated in the hollow portion of the cylindrical chassis such that the central positions of the core body and the one or more pressure-sensitive components agree with a center line position of the cylindrical chassis.

5. The position indicator according to claim 4, wherein the hollow portion of the cylindrical chassis is closed at a proximal end, opposite from the tip along the axial direction, with a cover body; and one of a fitting convex portion and a fitting concave portion is provided in the cover body, and a corresponding one of a fitting concave portion and a fitting convex portion is provided at the proximal end of the holder.

6. The position indicator according to claim 2, wherein a proximal end portion of the one or more pressure-sensitive components defines an engaging portion configured to align the central position of the one or more pressure-sensitive components disposed in the component disposing portion with the axial direction of the cylindrical chassis.

7. The position indicator according to claim 6, wherein the engaging portion includes a concave portion provided in the central position of the proximal end portion of the one or more pressure-sensitive components, a through hole extending through a wall provided adjacent to the concave portion, and a rod-like body configured to be fitted into the concave portion via the through hole.

8. The position indicator according to claim 1, wherein the holder is composed of a cylinder body, which is divided into a first accommodation portion and a second accommodation portion along its axial direction;

the core body engaging portion, the component disposing portion, and the printed wiring board are included in the first accommodation portion, or are included in both of the first accommodation portion and the second accommodation portion; and the second accommodating portion is engaged with the first accommodation portion to form the cylinder body to enclose therein the core body, the one or more pressure-sensitive components, and the printed wiring board.

9. The position indicator according to claim 1, wherein the holder is composed of a cylinder body accommodated in the hollow portion of the cylindrical chassis;

the core body, the one or more pressure-sensitive components, and the printed wiring board are inserted into the cylinder body of the holder, in aforementioned order, through an insertion opening provided at an axial end of the cylinder body, and the insertion opening is closed to modularize the holder; and the holder thus modularized is disposed in the hollow portion of the cylindrical chassis.

10. The position indicator according to claim 1, wherein the one or more pressure-sensitive components include a capacitor formed by a dielectric body and two electric conductors disposed to sandwich the dielectric body therebetween, and are configured to detect a distance change between the two electric conductors, which is caused by application of the pressing pressure to the core body, as a change in capacitance of the capacitor.

11. The position indicator according to claim 1, wherein the one or more pressure-sensitive components are composed of a semiconductor element including a first electrode and a second electrode disposed to face the first electrode via a defined distance, capacitance is formed between the first electrode and the second electrode, and said distance between the first and second electrodes is changed in response to application of the pressing pressure to the first electrode to thereby change the capacitance formed therebetween; and the position indicator further includes a depressing member configured to transfer the pressing pressure applied to the core body to the first electrode of the semiconductor element.

12. The position indicator according to claim 1, which is configured for use with a capacitance type sensor.

13. The position indicator according to claim 1, which is configured for use with an electromagnetic induction type sensor.

14. The position indicator according to claim 1, wherein the one or more pressure-sensitive components are composed of plural components configured to detect a change in inductance, which is caused by application of the pressing pressure to the core body.

15. The position indicator according to claim 14, further comprising an elongate first magnetic body extending in an axial direction and a coil wound around the first magnetic body, wherein the one or more pressure-sensitive components include:

an elastic body provided proximal to the first magnetic body along the axial direction;

a second magnetic body provided proximal to the first magnetic body along the axial direction; and a spring member configured to separate the second magnetic body away from the first magnetic body by a defined distance along the axial direction, and wherein, when the pressing pressure is applied to the core body, the first magnetic body is biased in a direction toward the second magnetic body against a biasing force of the spring member, to thereby cause the change in inductance to be detected.

16. A position indicator, comprising:

a cylindrical chassis defining a tip end at its distal end and a proximal end along its axial direction; and an elongate holder enclosed in the cylindrical chassis, the holder including:

a core body engaging portion configured to hold an elongate core body having a tip such that said tip protrudes from said tip end of the cylindrical chassis, a component disposing portion, which defines an opening portion that opens in a direction perpendicular to the axial direction and in which one or more pressure-sensitive components are arranged in the axial direction so as to receive a pressing pressure applied to the tip of the core body, the one or more pressure-sensitive components being configured to detect a displacement of the core body, in the axial direction, caused by application of the pressing pressure to the tip of the core body, and a printed wiring board mounting portion configured to mount thereon a printed wiring board including a circuit element to detect the pressing pressure applied to the tip of the core body;

wherein the pressing pressure is applied to the tip of the core body within the holder such that the pressing pressure is not directly applied to the cylindrical chassis that encloses the holder.

17. The position indicator according to claim 16, which is configured for use with a capacitance type sensor.

18. The position indicator according to claim 16, which is configured for use with an electromagnetic induction type sensor.

19. The position indicator according to claim 16, wherein the holder is composed of a cylinder body, which is divided into a first accommodation portion and a second accommodation portion along the axial direction;

the core body engaging portion, the component disposing portion, and the printed wiring board are included in the first accommodation portion, or are included in both of the first accommodation portion and the second accommodation portion; and the second accommodating portion is engaged with the first accommodating portion to form the cylinder body to enclose therein the core body, the one or more pressure-sensitive components, and the printed wiring board.

20. The position indicator according to claim 16, wherein the holder is composed of a cylinder body;

the core body, the one or more pressure-sensitive components, and the printed wiring board are inserted into the cylinder body of the holder, in aforementioned order, through an insertion opening provided at an axial end of the cylinder body, and the insertion opening is closed to modularize the holder; and the holder thus modularized is disposed in the cylindrical chassis.

* * * * *